(12) United States Patent
Vidal

(10) Patent No.: US 7,407,516 B2
(45) Date of Patent: Aug. 5, 2008

(54) DYEING COMPOSITION FOR KERATINOUS FIBERS COMPRISING A DICATIONIC DIAZO DYE

(75) Inventor: Laurent Vidal, Paris (FR)

(73) Assignee: L'Oreal, S.A., Paris (FR)

( * ) Notice: Subject to any disclaimer, the term of this patent is extended or adjusted under 35 U.S.C. 154(b) by 0 days.

(21) Appl. No.: 10/480,152

(22) PCT Filed: Jun. 11, 2002

(86) PCT No.: PCT/FR02/01991

§ 371 (c)(1),
(2), (4) Date: May 27, 2004

(87) PCT Pub. No.: WO02/100369

PCT Pub. Date: Dec. 19, 2002

(65) Prior Publication Data

US 2004/0200009 A1    Oct. 14, 2004

(30) Foreign Application Priority Data

Jun. 11, 2001   (FR)   ................... 01 07615

(51) Int. Cl.
*A61Q 5/10* (2006.01)
*C07D 295/00* (2006.01)
*C07D 233/00* (2006.01)

(52) U.S. Cl. .............. 8/405; 8/406; 8/410; 8/412; 8/437; 8/451; 8/463; 8/570; 8/571; 8/574; 546/184; 546/249; 546/400; 548/318.1

(58) Field of Classification Search .......... 8/405, 8/406, 410, 412, 437, 451, 463, 570, 571, 8/574; 548/318.1, 321, 400; 546/400, 184, 546/249

See application file for complete search history.

(56) References Cited

U.S. PATENT DOCUMENTS

| 3,271,383 | A | 9/1966 | Yamaya et al. |
|---|---|---|---|
| 3,291,788 | A | 12/1966 | Yamaya et al. |
| 3,635,940 | A | 1/1972 | Hegar et al. |
| 4,557,732 | A | 12/1985 | Hähnke et al. |
| 4,607,071 | A | 8/1986 | Hähnke et al. |
| 5,674,299 | A | 10/1997 | Käser |
| 5,708,151 | A | 1/1998 | Möckli |
| 6,455,737 | B1 | 9/2002 | Vidal et al. |
| 6,605,124 | B1 | 8/2003 | Vandenbossche et al. |
| 2001/0001333 | A1 | 5/2001 | Samain |
| 2002/0046432 | A1 | 4/2002 | Rondeau |
| 2003/0019053 | A9 | 1/2003 | Rondeau |
| 2004/0148711 | A1 | 8/2004 | Rondeau |
| 2004/0237213 | A1 | 12/2004 | Plos et al. |

FOREIGN PATENT DOCUMENTS

| CA | 2161947 | 5/1996 |
|---|---|---|
| DE | 1 444 278 | 12/1968 |
| DE | 41 28 490 | 3/1993 |
| EP | 0 044 061 | 1/1982 |
| EP | 0 757 083 | 2/1997 |
| FR | 2 426 752 | 12/1979 |
| FR | 2 741 798 | 6/1997 |
| FR | 2 776 923 A1 | 10/1999 |
| GB | 1 186 753 | 4/1970 |
| GB | 2 022 099 | 12/1979 |
| JP | 54-156878 | 12/1979 |
| JP | 57-047985 | 3/1982 |
| JP | 08-074197 | 3/1996 |
| JP | 08-225538 | 9/1996 |
| JP | 11-343218 | 12/1999 |
| JP | 2002-535305 | 10/2002 |
| JP | 2002-535313 | 10/2002 |
| JP | 2004-534878 | 11/2004 |
| WO | WO 00/43356 | 7/2000 |
| WO | WO 00/43368 | 7/2000 |
| WO | WO 02/100367 A1 | 12/2002 |

OTHER PUBLICATIONS

English language Derwent Abstract of DE 1 444 278, Dec. 19, 1968.
English language Derwent Abstract of DE 41 28 490, Mar. 4, 1993.
English language Derwent Abstract of EP 0 044 061, Jan. 20, 1982.
English language Derwent Abstract of EP 0 757 083, Feb. 5, 1997.
English Language Derwent Abstract of JP 2004-537878, 2004.
English Language Derwent Abstract of JP 57 047985, 1982.
International Search Report for PCT/FR 02/01991, Nov. 27, 2003.

*Primary Examiner*—Eisa B Elhilo
(74) *Attorney, Agent, or Firm*—Finnegan, Henderson, Farabow, Garrett & Dunner, L.L.P.

(57) ABSTRACT

The present disclosure relates to a novel dyeing composition for dyeing human keratinous fibers, such as hair, comprising at least one dicationic diazo dye of formula (I):

[W$_1$—N=N—W$_2$—W$_3$—(W$_4$—W$_5$)$_p$-]$_2$-L     Formula (I)

as well as the process for dyeing hair using same. Certain compounds of formula (I) are also disclosed herein.

45 Claims, No Drawings

DYEING COMPOSITION FOR KERATINOUS FIBERS COMPRISING A DICATIONIC DIAZO DYE

FIELD OF THE INVENTION

The invention relates to a novel dye composition for dyeing human keratin fibers, in particular the hair, comprising a particular dicationic diazo dye, and also to the process for dyeing keratin fibers using such a composition. The invention also relates to novel dicationic diazo dyes.

BACKGROUND OF THE INVENTION

It is known practice to dye keratin fibers, and in particular human hair, with dye compositions containing oxidation dye precursors, which are generally known as oxidation bases, such as ortho- or para-phenylenediamines, ortho- or para-aminophenols and heterocyclic compounds. These oxidation bases are colorless or weakly colored compounds, which, when combined with oxidizing products, give rise to colored compounds by a process of oxidative condensation.

It is also known that the shades obtained with these oxidation bases may be varied by combining them with couplers or coloration modifiers, the latter agents being chosen especially from aromatic meta-diamines, meta-aminophenols, meta-diphenols and certain heterocyclic compounds such as indole compounds.

The variety of molecules used as oxidation bases and couplers allows a wide range of colors to be obtained.

This process of oxidation dyeing consists in applying to the keratin fibers oxidation bases or a mixture of oxidation bases and of couplers with an oxidizing agent, for example aqueous hydrogen peroxide solution, leaving the application on the fibers, and then rinsing the fibers. The colorations resulting therefrom are permanent, strong and fast with respect to external agents, especially light, bad weather, washing, perspiration and rubbing. Generally applied at basic pH, dyeing and simultaneous lightening of the fiber may be obtained, which is reflected in practice by the possibility of obtaining a final coloration that is lighter than the original color. In addition, lightening of the fiber may have the advantageous effect of producing a unified color in the case of gray hair, and, in the case of naturally pigmented hair, of bringing out the color, i.e. of making it more visible.

It is also known practice to dye keratin fibers by direct dyeing. The process conventionally used in direct dyeing consists in applying to the keratin fibers direct dyes, which are colored and coloring molecules that have affinity for the fibers, leaving the dyes on the fibers, and then rinsing the fibers.

It is known practice, for example, to use direct dyes belonging to the nitrobenzene, anthraquinone, nitropyridine, azo, indoamine, azine or triarylmethane class.

The colorations resulting therefrom are particularly chromatic colorations, that are temporary or semi-permanent since the nature of the interactions binding the direct dyes to the keratin fiber, and their desorption from the surface and/or the core of the fiber are responsible for their poor dyeing power and their poor resistance to washing or to perspiration. These direct dyes are also generally light-sensitive due to the poor resistance of the chromophore with respect to photochemical attack, leading over time to fading of the coloration of the hair. In addition, their light sensitivity is dependent on their uniform distribution or distribution as aggregates in the keratin fiber.

It is known practice to use direct dyes in combination with oxidizing agents. However, direct dyes are generally sensitive to the action of oxidizing agents such as aqueous hydrogen peroxide solution, and reducing agents such as sodium bisulfite, which makes it generally difficult to use them in compositions for lightening direct dyeing based on aqueous hydrogen peroxide solution and based on a basifying agent or in oxidation dye compositions in combination with precursors such as oxidation bases or couplers.

For example, it has been proposed in patent applications FR-1 584 965 and JP-062 711 435 to dye the hair with dye compositions based on nitro direct dyes and/or dispersed azo dyes and on ammoniacal aqueous hydrogen peroxide solution, by applying to the hair a mixture of said dyes and of said oxidizing agent, prepared just before use. However, the colorations obtained are found to have insufficient resistance and disappear on shampooing, making the lightening of the hair fiber show through. Such a coloration becomes unattractive by changing over time.

It has also been proposed in patent applications JP-53 95693 and JP-55 022 638 to dye the hair with compositions based on cationic direct dyes of oxazine type and on ammoniacal aqueous hydrogen peroxide solution, by applying to the hair ammoniacal aqueous hydrogen peroxide solution in a first step, followed by a composition based on the oxazine direct dye in a second step. This coloration is unsatisfactory because it requires a process that is made too slow by the leave-in times of the two successive steps. If, besides that, an extemporaneous mixture of the oxazine direct dye with ammoniacal aqueous hydrogen peroxide solution is applied to the hair, the hair fiber is not colored or at most, a virtually nonexistent coloration is obtained.

More recently, patent application FR 2 741 798 has disclosed dye compositions containing direct dyes comprising at least one quaternized nitrogen atom of the azo or azomethine type, said compositions being for extemporaneous mixing at basic pH with an oxidizing composition. These compositions make it possible to obtain uniform, resistant and bright colorations with glints. However, they do not allow keratin fibers to be dyed as strongly as with oxidation dye compositions.

There is thus a real need to find chromatic direct dyes that allow keratin fibers to be dyed as strongly as with oxidation dyes, which are just as stable as oxidation dyes to light, which are also fast with respect to bad weather, washing and perspiration, and which are also stable enough in the presence of oxidizing and reducing agents to be able simultaneously to obtain lightening of the fiber either by using lightening direct compositions containing them, or by using oxidation dye compositions containing them. There is also a real need to find direct dyes that allow keratin fibers to be dyed to obtain a very wide range of colors, in particular very chromatic colors, not forgetting the "fundamental" shades, for instance, blacks and browns.

DETAILED DESCRIPTION OF THE INVENTION

These aims are achieved with the present invention, one subject of which is a composition for dyeing human keratin fibers, and in particular the hair, comprising at least one dicationic diazo dye of formula (I) below:

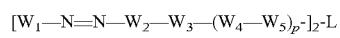

$$[W_1—N=N—W_2—W_3—(W_4—W_5)_p-]_2-L \qquad \text{Formula (I)}$$

in which
p=0 or 1,
$W_1$ represents a heteroaromatic radical of formulae (II) and (III) below:

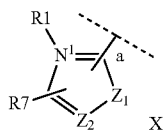

(II)

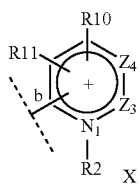

(III)

$W_2$ represents a carbon-based, pyridine-based or pyridazine-based aromatic group of formula (IV) below:

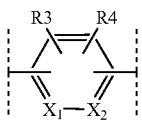

(IV)

$W_3$ and $W_5$ represent, independently of each other, a radical —$NR_{14}$— or an oxygen atom —O—, or a nitrogen atom, $W_4$ represents a saturated or unsaturated, linear or branched $C_1$-$C_{16}$ hydrocarbon-based chain, which can form one or more 3- to 6-membered carbon-based rings, one or more carbon atoms of the carbon-based chain of which may be replaced with an oxygen, nitrogen or sulfur atom or with an $SO_2$ group, and the carbon atoms of which may be substituted, independently of each other, with one or more halogen atoms, $W_4$ not comprising a peroxide bond or diazo or nitroso radicals; a piperazine ring; a group of formula (V) below:

Formula (V)

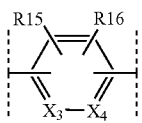

in which formulae (II), (III), (IV) and (V):
  $X_1$ represents a nitrogen atom or a radical $CR_5$
  $X_2$ represents a nitrogen atom or a radical $CR_6$
  $X_3$ represents a nitrogen atom or a radical $CR_{17}$
  $X_4$ represents a nitrogen atom or a radical $CR_{18}$
  $Z_1$ represents an oxygen or sulfur atom or a radical $NR_8$,
  $Z_2$ represents a nitrogen atom or a radical $CR_9$,
  it being understood that formula (II) does not denote an imidazolium ring, i.e. ($Z_1$, $Z_2$) is different than ($NR_8$, $CR_9$),
  $Z_3$ represents a nitrogen atom or a radical $CR_{12}$,
  $Z_4$ represents a nitrogen atom or a radical $CR_{13}$, the bond a of the 5-membered cationic ring of formula (II) is linked to the azo group of formula (I),
  the bond b of the 6-membered cationic ring of formula (III) is linked to the azo group of formula (I),
  when p=0,
  then L represents a linear or branched, saturated $C_1$-$C_{16}$ hydrocarbon-based chain, which can form one or more 3- to 6-membered carbon-based rings, one or more carbon atoms of the carbon-based chain of which may be replaced with an oxygen, nitrogen or sulfur atom or with an $SO_2$ group, and the carbon atoms of which may be substituted, independently of each other, with one or more halogen atoms; L not comprising a peroxide bond or diazo or nitroso radicals,
  when p=1,
  then L represents a saturated or unsaturated, linear or branched $C_1$-$C_{16}$ hydrocarbon-based chain, which can form one or more 3- to 6-membered carbon-based rings, one or more carbon atoms of the carbon-based chain of which may be replaced with an oxygen, nitrogen or sulfur atom or with an $SO_2$ group, and not comprising a peroxide bond or diazo or nitroso radicals,
  $R_3$, $R_4$, $R_5$, $R_6$, $R_7$, $R_9$, $R_{10}$, $R_{11}$, $R_{12}$, $R_{13}$, $R_{14}$, $R_{15}$, $R_{16}$, $R_{17}$ and $R_{18}$ represent, together or independently of each other, a hydrogen atom, a saturated or unsaturated, linear or branched $C_1$-$C_{16}$ hydrocarbon-based chain, which can form one or more 3- to 6-membered carbon-based rings, one or more carbon atoms of the carbon-based chain of which may be replaced with an oxygen, nitrogen or sulfur atom or with an $SO_2$ group, and the carbon atoms of which may be substituted, independently of each other, with one or more halogen atoms; $R_3$, $R_4$, $R_5$, $R_6$, $R_7$, $R_9$, $R_{10}$, $R_{11}$, $R_{12}$, $R_{13}$, $R_{14}$, $R_{15}$, $R_{16}$, $R_{17}$ and $R_{18}$ not comprising a peroxide bond or diazo or nitroso radicals,
  $R_3$ with $R_4$, $R_7$ with $R_9$, $R_{10}$ with $R_{11}$, $R_{12}$ with $R_{13}$ and $R_{15}$ with $R_{16}$ may form a carbon-based aromatic ring, such as a phenyl,
  X is an organic or mineral anion.

According to the invention, when it is indicated that one or more of the carbon atoms of the hydrocarbon-based chain defined for the radicals L, $R_3$, $R_4$, $R_5$, $R_6$, $R_7$, $R_9$, $R_{10}$, $R_{11}$, $R_{12}$, $R_{13}$, $R_{14}$, $R_{15}$, $R_{16}$, $R_{17}$ and $R_{18}$ may be replaced with an oxygen, nitrogen or sulfur atom or with an $SO_2$ group, and/or when these hydrocarbon-based chains are unsaturated, this means that the following conversions may be performed, for example:

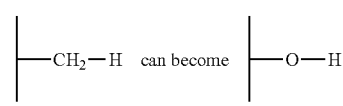

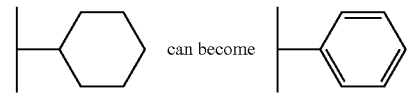

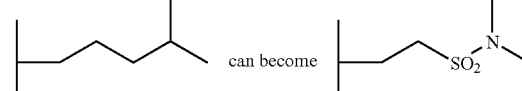

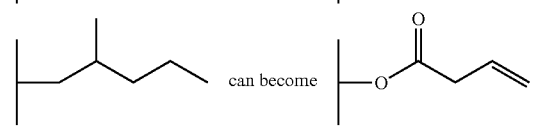

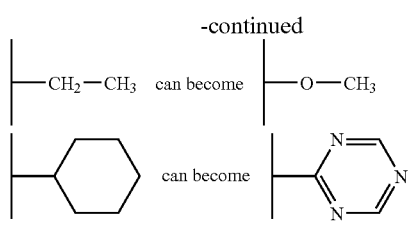

In particular the term "branched hydrocarbon-based chain" means a chain that can form one or more 3- to 6-membered carbon-based rings. The term "unsaturated hydrocarbon-based chain" means a chain that may comprise one or more double bonds and/or one or more triple bonds, this hydrocarbon-based chain possibly leading to aromatic groups.

X is an organic or mineral anion chosen, for example, from a halide such as chloride, bromide, fluoride or iodide; a hydroxide; a sulfate; a hydrogen sulfate; a $(C_1\text{-}C_6)$alkyl sulfate, for example a methyl sulfate or an ethyl sulfate; an acetate; a tartrate; an oxalate; a $(C_1\text{-}C_6)$alkylsulfonate such as methylsulfonate; an arylsulfonate that is unsubstituted or substituted with a $C_1\text{-}C_4$ alkyl radical, for instance a 4-tolylsulfonate.

$R_3$, $R_4$, $R_5$, $R_6$, $R_{10}$, $R_{11}$, $R_{12}$, $R_{13}$, $R_{15}$, $R_{16}$, $R_{17}$ and $R_{18}$ preferably represent, independently of each other, a hydrogen atom; a linear or branched $C_1\text{-}C_4$ alkyl radical, optionally substituted with one or more radicals chosen from hydroxyl, $C_1\text{-}C_2$ alkoxy, $C_2\text{-}C_4$ (poly)hydroxyalkoxy, amino, $C_1\text{-}C_2$ (di)alkylamino, carboxyl and sulfonic radicals; a phenyl radical optionally substituted with one or more radicals chosen from hydroxyl, $C_1\text{-}C_2$ alkoxy, $C_2\text{-}C_4$ (poly)hydroxyalkoxy, amino, $C_1\text{-}C_2$ (di)alkylamino, carboxyl and sulfonic radicals or a halogen atom such as chlorine, fluorine or bromine; a carboxyl radical; a sulfonylamino radical; a sulfonic radical; a $C_1\text{-}C_2$ alkoxy radical; a $C_2\text{-}C_4$ (poly)hydroxyalkoxy radical; an amino radical; a $C_1\text{-}C_2$ (di)alkylamino radical; a $C_2\text{-}C_4$ (poly)hydroxyalkylamino radical.

More preferably, $R_3$, $R_4$, $R_5$, $R_6$, $R_{10}$, $R_{11}$, $R_{12}$, $R_{13}$, $R_{15}$, $R_{16}$, $R_{17}$ and $R_{18}$ represent a hydrogen atom, a $C_1\text{-}C_4$ alkyl radical optionally substituted with one or more radicals chosen from hydroxyl, amino and $C_1\text{-}C_2$ (di)alkylamino radicals; a carboxyl radical; a $C_1\text{-}C_2$ alkoxy radical; an amino radical; a $C_1\text{-}C_2$ (di)alkylamino radical; a $C_2\text{-}C_4$ (poly)hydroxyalkylamino radical.

According to one particularly preferred embodiment, $R_3$, $R_4$, $R_5$, $R_6$, $R_{10}$, $R_{11}$, $R_{12}$, $R_{13}$, $R_{15}$, $R_{16}$, $R_{17}$ and $R_{18}$ represent a hydrogen atom, a methyl, phenyl or 2-hydroxymethyl radical, a carboxyl, a methoxy, ethoxy or 2-hydroxyethyloxy radical, or an amino, methylamino, dimethylamino or 2-hydroxyethylamino radical.

$R_7$ and $R_9$ represent, independently of each other, a hydrogen atom; a linear or branched $C_1\text{-}C_4$ alkyl radical optionally substituted with one or more radicals chosen from hydroxyl, $C_1\text{-}C_2$ alkoxy, $C_2\text{-}C_4$ (poly)hydroxyalkoxy, amino, $C_1\text{-}C_2$ (di)alkylamino, carboxyl and sulfonic radicals; an optionally substituted phenyl radical; a carboxyl radical; a sulfonylamino radical.

Among these substituents, $R_7$ and $R_9$ preferably represent a hydrogen atom, a phenyl radical or a $C_1\text{-}C_4$ alkyl radical optionally substituted with one or more radicals chosen from hydroxyl, amino, $C_1\text{-}C_2$ (di)alkylamino and carboxyl radicals.

According to one particularly preferred embodiment, $R_7$ and $R_9$ preferably represent a hydrogen atom, a methyl, phenyl or 2-hydroxymethyl radical or a carboxyl.

$R_{14}$ preferably represents a hydrogen atom; a linear or branched $C_1\text{-}C_6$ alkyl radical, optionally substituted with one or more radicals chosen from hydroxyl, $C_1\text{-}C_2$ alkoxy, $C_2\text{-}C_4$ (poly)hydroxyalkoxy, amino, $C_1\text{-}C_2$ (di)alkylamino, carboxyl and sulfonic radicals; an optionally substituted phenyl radical.

$R_{14}$ preferably represents a hydrogen atom; a linear or branched $C_1\text{-}C_4$ alkyl radical, optionally substituted with one or more radicals chosen from hydroxyl, $C_1\text{-}C_2$ alkoxy, amino and $C_1\text{-}C_2$ (di)alkylamino radicals.

$R_{14}$ preferably represents a hydrogen atom; a methyl, ethyl, 2-hydroxyethyl, 2-aminoethyl, 2-methoxyethyl, 1-carboxymethyl, 2-carboxyethyl or 2-sulfonylethyl radical.

$R_{14}$ preferably represents a hydrogen atom; a methyl, ethyl, 2-hydroxyethyl or 2-aminoethyl radical.

$R_1$, $R_2$ and $R_8$ represent a linear or branched $C_1\text{-}C_8$ alkyl radical, optionally substituted with one or more radicals chosen from hydroxyl, $C_1\text{-}C_2$ alkoxy, $C_2\text{-}C_4$ (poly)hydroxyalkoxy, amino, $C_1\text{-}C_2$ (di)alkylamino, carboxyl and sulfonic radicals; an optionally substituted phenyl radical.

Among these substituents, $R_1$, $R_2$ and $R_8$ preferably represent a $C_1\text{-}C_4$ alkyl radical optionally substituted with one or more radicals chosen from hydroxyl, $C_1\text{-}C_2$ alkoxy, amino, $C_1\text{-}C_2$ (di)alkylamino, carboxyl and sulfonic radicals.

According to one particularly preferred embodiment, $R_1$, $R_2$ and $R_8$ preferably represent a methyl, ethyl, 2-hydroxyethyl, 1-carboxymethyl, 2-carboxyethyl or 2-sulfonylethyl radical.

$W_1$ preferably represents a triazolium, thiazolium or pyridinium cationic group substituted with the preferred radicals $R_1$, $R_2$, $R_7$, $R_{10}$, $R_{11}$, $R_{12}$ and $R_{13}$.

$W_2$ preferably represents a phenyl or pyridyl group substituted with the preferred radicals $R_3$, $R_4$, $R_5$ and $R_6$.

$W_3$ and $W_5$ preferably represent, independently of each other, a group —$NR_{14}$—, with the preferred meanings of $R_{14}$.

$W_4$ preferably represents a linear or branched $C_2\text{-}C_6$ alkyl radical, optionally substituted with one or more radicals chosen from hydroxyl, $C_1\text{-}C_2$ alkoxy, $C_2\text{-}C_4$ (poly)hydroxyalkoxy, amino, $C_1\text{-}C_2$ (di)alkylamino, carboxyl and sulfonic radicals; a phenyl radical optionally substituted with one or more radicals chosen from hydroxyl, $C_1\text{-}C_2$ alkoxy, $C_2\text{-}C_4$ (poly)hydroxyalkoxy, amino, $C_1\text{-}C_2$ (di)alkylamino, carboxyl and sulfonic radicals or a halogen atom such as chlorine, fluorine or bromine; a naphthyl radical optionally substituted with one or more radicals chosen from hydroxyl, $C_1\text{-}C_2$ alkoxy, $C_2\text{-}C_4$ (poly)hydroxyalkoxy, amino, $C_1\text{-}C_2$ (di)alkylamino, carboxyl and sulfonic radicals or a halogen atom such as chlorine, fluorine or bromine, or a piperazine radical formed with the two radicals $W_3$ and $W_5$.

$W_4$ preferably represents a linear or branched $C_2\text{-}C_4$ alkyl radical, optionally substituted with one or more hydroxyl radicals; a phenyl radical optionally substituted with one or more radicals chosen from hydroxyl, $C_1\text{-}C_2$ alkoxy, $C_2\text{-}C_4$ (poly)hydroxyalkoxy, amino, $C_1\text{-}C_2$ (di)alkylamino, carboxyl and sulfonic radicals; a naphthyl radical optionally substituted with one or more radicals chosen from hydroxyl, $C_1\text{-}C_2$ alkoxy, $C_2\text{-}C_4$ (poly)hydroxyalkoxy, amino, $C_1\text{-}C_2$ (di)alkylamino, carboxyl and sulfonic radicals, or a piperazine radical formed with the two radicals $W_3$ and $W_5$.

$W_4$ preferably represents an ethyl, propyl, butyl or 2-hydroxypropyl radical; a phenyl radical; a naphthyl radical; a piperazine ring formed with the two radicals $W_3$ and $W_5$.

L preferably represents a group chosen from —CO—; —CO—CH$_2$—CH$_2$—CO—; —CO—CO—; benzo-1,4-dicarbonyl; ethyl; 1,4-phenyl; triazine; pyrimidine.

L preferably represents an ethyl or triazine group.

The concentration of dicationic diazo dye of formula (I) may range from 0.001% to 5% by weight approximately, and preferably from about 0.05% to 2% by weight, relative to the total weight of the dye composition.

Among the dicationic diazo dyes of formula (I) according to the present invention, mention may be made especially of the compounds having the following formulae:

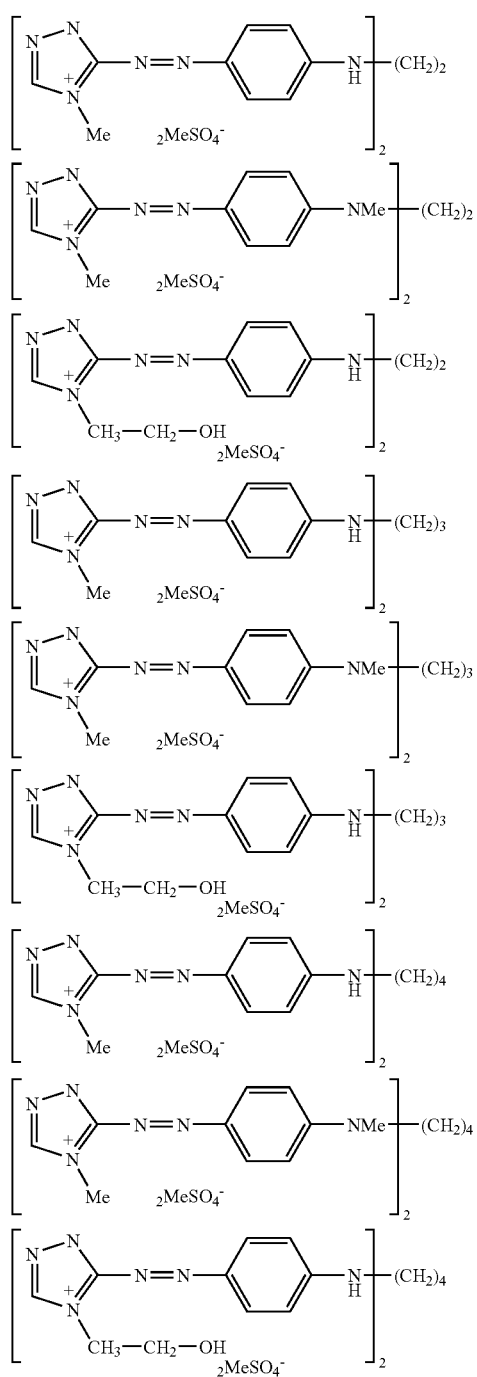
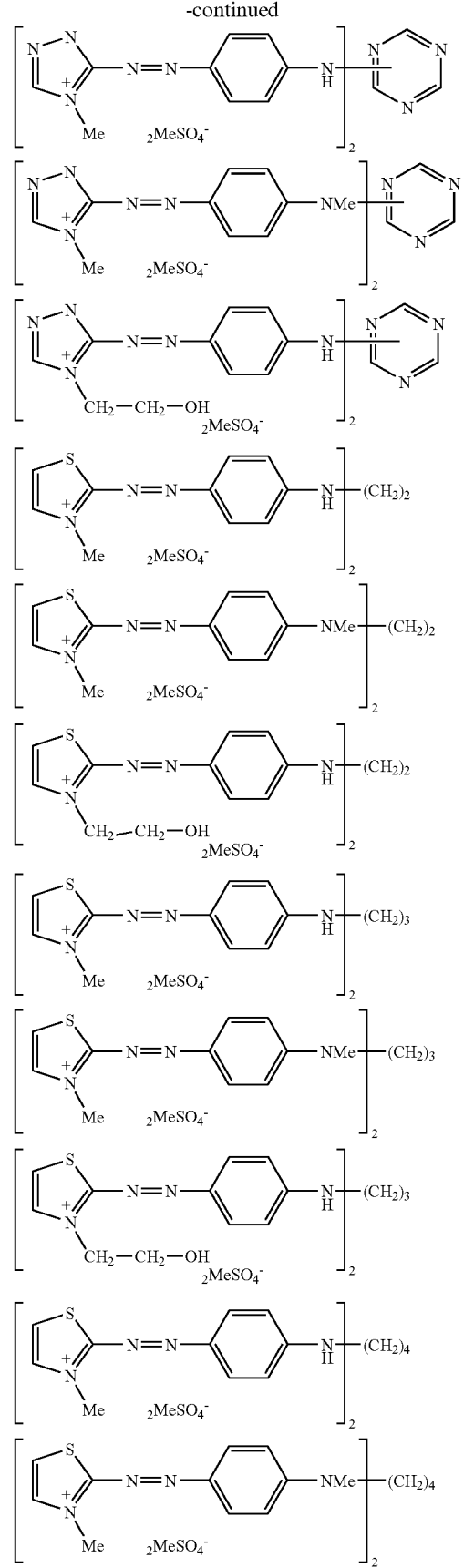

-continued
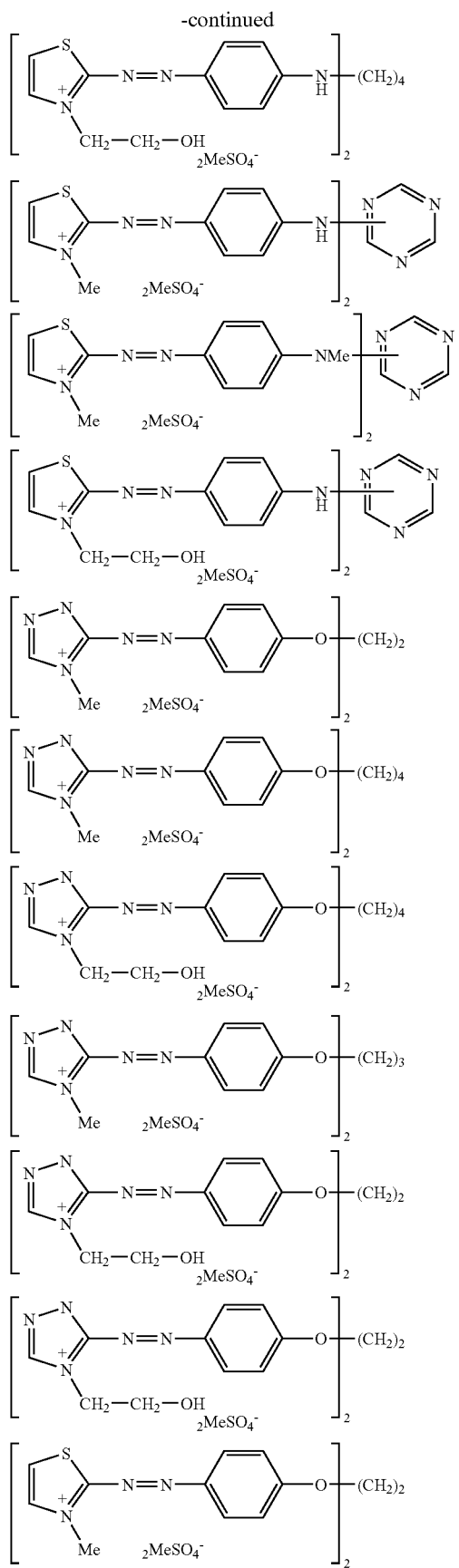
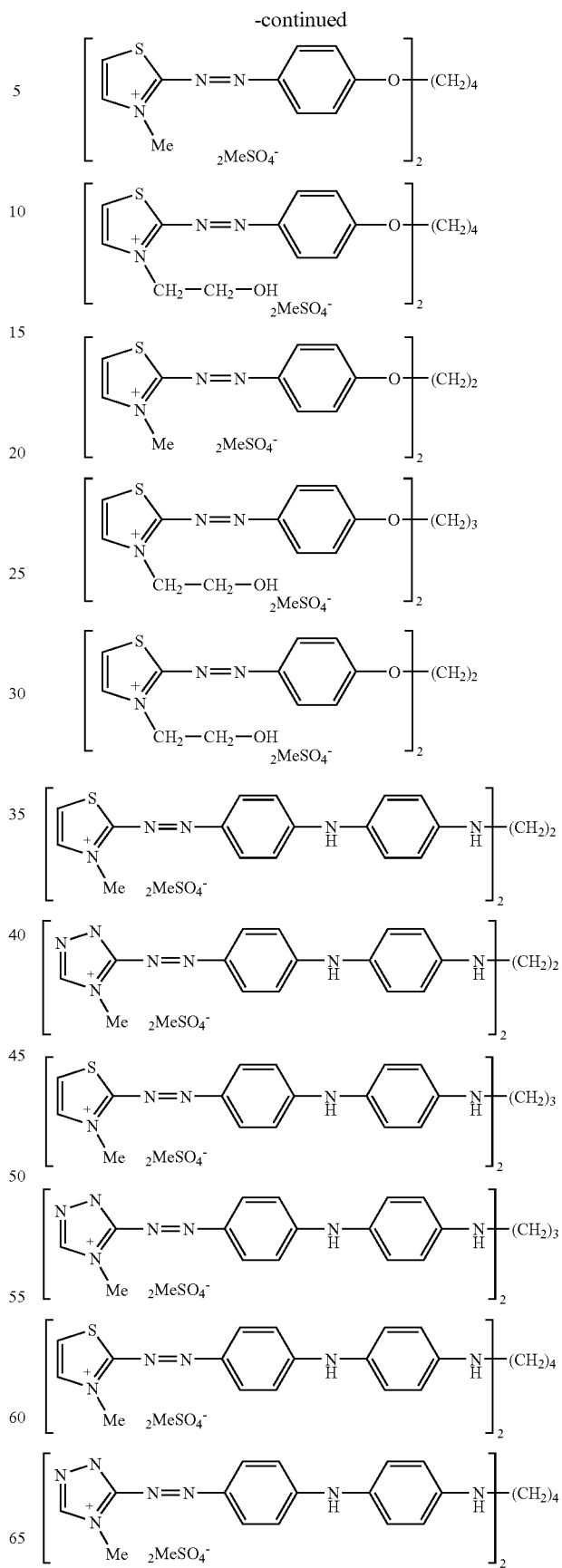

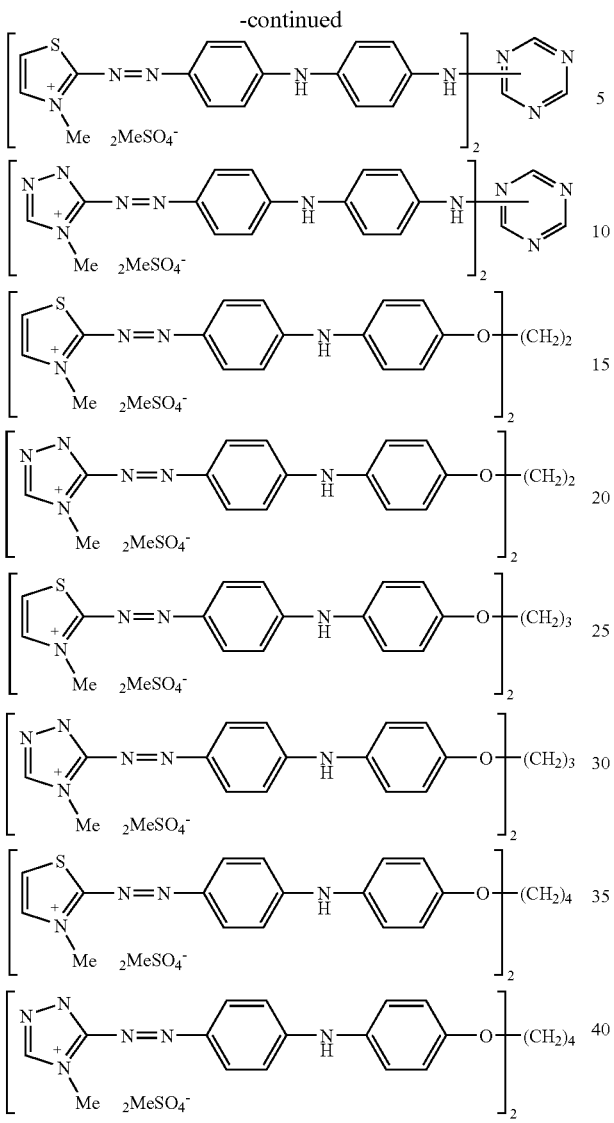

Among these compounds, the ones even more particularly preferred according to the invention are those comprising a triazolium ring.

In the above formulae, Me denotes a $CH_3$ radical.

The dye composition in accordance with the invention may also contain direct dyes other than those of formula (I), these dyes possibly being chosen especially from neutral, acidic or cationic nitrobenzene direct dyes, neutral, acidic or cationic azo direct dyes, quinone and in particular neutral, acidic or cationic anthraquinone direct dyes, azine direct dyes, methine direct dyes, triarylmethane direct dyes, indoamine direct dyes and natural direct dyes.

Among the benzenic direct dyes that may be used according to the invention, mention may be made, in a non-limiting manner, of the following compounds:

1,4-diamino-2-nitrobenzene
1-amino-2-nitro-4-(β-hydroxyethylamino)benzene
1-amino-2-nitro-4-bis(β-hydroxyethyl)aminobenzene
1,4-bis(β-hydroxyethylamino)-2-nitrobenzene
1-β-hydroxyethylamino-2-nitro-4-bis-(β-hydroxyethy-lamino)benzene
1-β-hydroxyethylamino-2-nitro-4-aminobenzene
1-β-hydroxyethylamino-2-nitro-4-(ethyl)(β-hydroxy-ethyl)aminobenzene
1-amino-3-methyl-4-β-hydroxyethylamino-6-nitroben-zene
1-amino-2-nitro-4-β-hydroxyethylamino-5-chloroben-zene
1,2-diamino-4-nitrobenzene
1-amino-2-β-hydroxyethylamino-5-nitrobenzene
1,2-bis(β-hydroxyethylamino)-4-nitrobenzene
1-amino-2-[tris(hydroxymethyl)methylamino]-5-ni-trobenzene
1-hydroxy-2-amino-5-nitrobenzene
1-hydroxy-2-amino-4-nitrobenzene
1-hydroxy-3-nitro-4-aminobenzene
1-hydroxy-2-amino-4,6-dinitrobenzene
1-β-hydroxyethyloxy-2-β-hydroxyethylamino-5-ni-trobenzene
1-methoxy-2-β-hydroxyethylamino-5-nitrobenzene
1-β-hydroxyethyloxy-3-methylamino-4-nitrobenzene
1-β,γ-dihydroxypropyloxy-3-methylamino-4-nitroben-zene
1-β-hydroxyethylamino-4-β,γ-dihydroxypropyloxy-2-ni-trobenzene
1-β,γ-dihydroxypropylamino-4-trifluoromethyl-2-ni-trobenzene
1-β-hydroxyethylamino-4-trifluoromethyl-2-nitroben-zene
1-β-hydroxyethylamino-3-methyl-2-nitrobenzene
1-β-aminoethylamino-5-methoxy-2-nitrobenzene
1-hydroxy-2-chloro-6-ethylamino-4-nitrobenzene
1-hydroxy-2-chloro-6-amino-4-nitrobenzene
1-hydroxy-6-[bis(β-hydroxyethyl)amino]-3-nitrobenzene
1-β-hydroxyethylamino-2-nitrobenzene
1-hydroxy-4-β-hydroxyethylamino-3-nitrobenzene.

Among the azo direct dyes that may be used according to the invention, mention may be made of the cationic azo dyes described in patent applications WO 95/15144, WO 95/01772 and EP 714 954, the content of which forms an integral part of the invention.

Among these compounds, mention may be made most particularly of the following dyes:

1,3-dimethyl-2-[[4-(dimethylamino)phenyl]azo]-1H-imi-dazolium chloride,
1,3-dimethyl-2-[(4-aminophenyl)azo]-1H-imidazolium chloride,
1-methyl-4-[(methylphenylhydrazono)methyl]pyri-dinium methyl sulfate.

Among the azo direct dyes that may also be mentioned are the following dyes described in the Colour Index International 3rd edition:

Disperse Red 17
Acid Yellow 9
Acid Black 1
Basic Red 22
Basic Red 76
Basic Yellow 57
Basic Brown 16
Acid Yellow 36
Acid Orange 7
Acid Red 33
Acid Red 35
Basic Brown 17
Acid Yellow 23
Acid Orange 24
Disperse Black 9.

Mention may also be made of 1-(4'-aminodiphenylazo)-2-methyl-4-[bis(β-hydroxyethyl)amino]benzene and 4-hydroxy-3-(2-methoxyphenylazo)-1-naphthalenesulfonic acid.

Among the quinone direct dyes that may be mentioned are the following dyes:
Disperse Red 15
Solvent Violet 13
Acid Violet 43
Disperse Violet 1
Disperse Violet 4
Disperse Blue 1
Disperse Violet 8
Disperse Blue 3
Disperse Red 11
Acid Blue 62
Disperse Blue 7
Basic Blue 22
Disperse Violet 15
Basic Blue 99 and also the following compounds:
1-N-methylmorpholiniumpropylamino-4-hydroxyanthraquinone
1-aminopropylamino-4-methylaminoanthraquinone
1-aminopropylaminoanthraquinone
5-β-hydroxyethyl-1,4-diaminoanthraquinone
2-aminoethylaminoanthraquinone
1,4-bis(β,γ-dihydroxypropylamino)anthraquinone Among the azine dyes that may be mentioned are the following compounds:
Basic Blue 17
Basic Red 2.

Among the triarylmethane dyes that may be used according to the invention, mention may be made of the following compounds:
Basic Green 1
Acid Blue 9
Basic Violet 3
Basic Violet 14
Basic Blue 7
Acid Violet 49
Basic Blue 26
Acid Blue 7

Among the indoamine dyes that may be used according to the invention, mention may be made of the following compounds:
2-β-hydroxyethylamino-5-[bis(β-4'-hydroxyethyl)amino]-anilino-1,4-benzoquinone;
2-β-hydroxyethylamino-5-(2'-methoxy-4'-amino)anilino-1,4-benzoquinone;
3-N(2'-chloro-4'-hydroxy)phenylacetylamino-6-methoxy-1,4-benzoquinoneimine;
3-N(3'-chloro-4'-methylamino)phenylureido-6-methyl-1,4-benzoquinoneimine;
3-[4'-N-(ethylcarbamylmethyl)amino]phenylureido-6-methyl-1,4-benzoquinoneimine.

Among the natural direct dyes that may be used according to the invention, mention may be made of lawsone, juglone, alizarin, purpurin, carminic acid, kermesic acid, purpurogallin, protocatechaldehyde, indigo, isatin, curcumin, spinulosin and apigenidin. Extracts or decoctions containing these natural dyes may also be used, and especially henna-based poultices or extracts.

The additional direct dye(s) preferably represent(s) from 0.001% to 20% by weight approximately, and even more preferably from 0.005% to 10% by weight approximately, relative to the total weight of the product.

The composition of the invention may also comprise an oxidizing agent. This oxidizing agent may be any oxidizing agent conventionally used for bleaching keratin fibers. The oxidizing agent is preferably chosen from hydrogen peroxide, urea peroxide, alkali metal bromates, persalts such as perborates and persulfates, peracids and enzymes, among which mention may be made of peroxidases, 2-electron oxidoreductases such as uricases, and 4-electron oxigenases such as laccases. The use of hydrogen peroxide is particularly preferred.

The composition according to the invention may also comprise an oxidation base. This oxidation base may be chosen from the oxidation bases conventionally used in oxidation dyeing, for example para-phenylenediamines, bis(phenyl)alkylenediamines, para-aminophenols, ortho-aminophenols and heterocyclic bases.

Among the para-phenylenediamines that may be mentioned, for example, are para-phenylenediamine, para-tolylenediamine, 2-chloro-para-phenylenediamine, 2,3-dimethyl-para-phenylenediamine, 2,6-dimethyl-para-phenylene-diamine, 2,6-diethyl-para-phenylenediamine, 2,5-dimethyl-para-phenylenediamine, N,N-dimethyl-para-phenylenediamine, N,N-diethyl-para-phenylenediamine, N,N-dipropyl-para-phenylenediamine, 4-amino-N,N-diethyl-3-methylaniline, N,N-bis(β-hydroxyethyl)-para-phenylenediamine, 4-N,N-bis(β-hydroxyethyl)amino-2-methylaniline, 4-N,N-bis(β-hydroxyethyl)amino-2-chloroaniline, 2-β-hydroxyethyl-para-phenylenediamine, 2-fluoro-para-phenylenediamine, 2-isopropyl-para-phenylenediamine, N-(β-hydroxypropyl)-para-phenylenediamine, 2-hydroxymethyl-para-phenylenediamine, N,N-dimethyl-3-methyl-para-phenylenediamine, N-ethyl-N-(β-hydroxyethyl)-para-phenylenediamine, N-(β,γ-dihydroxypropyl)-para-phenylenediamine, N-(4'-aminophenyl)-para-phenylenediamine, N-phenyl-para-phenylenediamine, 2-β-hydroxyethyloxy-para-phenylenediamine, 2-β-acetylaminoethyloxy-para-phenylenediamine, N-(β-methoxyethyl)-para-phenylenediamine, 4-aminophenylpyrrolidine, 2-thienyl-para-phenylenediamine, 2-β-hydroxyethylamino-5-aminotoluene, and the addition salts thereof with an acid.

Among the para-phenylenediamines mentioned above, para-phenylenediamine, para-tolylenediamine, 2-isopropyl-para-phenylenediamine, 2-β-hydroxyethyl-para-phenylenediamine, 2-β-hydroxyethyloxy-para-phenylenediamine, 2,6-dimethyl-para-phenylenediamine, 2,6-diethyl-para-phenylenediamine, 2,3-dimethyl-para-phenylenediamine, N,N-bis(β-hydroxyethyl)-para-phenylenediamine, 2-chloro-para-phenylenediamine and 2-β-acetylaminoethyloxy-para-phenylenediamine, and the addition salts thereof with an acid, are particularly preferred.

Among the bis(phenyl)alkylenediamines that may be mentioned, for example, are N,N'-bis(β-hydroxyethyl)-N,N'-bis (4'-aminophenyl)-1,3-diaminopropanol, N,N'-bis(β-hydroxyethyl)-N,N'-bis(4'-aminophenyl)ethylenediamine, N,N'-bis(4-aminophenyl)-tetramethylenediamine, N,N'-bis (β-hydroxyethyl)-N,N'-bis(4-aminophenyl)tetramethylenediamine, N,N'-bis(4-methylamino-phenyl)tetramethylenediamine, N,N'-bis(ethyl)-N,N'-bis(4'-amino-3'-methylphenyl) ethylenediamine and 1,8-bis (2,5-diaminophenoxy)-3,6-dioxaoctane, and the addition salts thereof with an acid.

Among the para-aminophenols that may be mentioned, for example, are para-aminophenol, 4-amino-3-methylphenol, 4-amino-3-fluorophenol, 4-amino-3-hydroxymethylphenol, 4-amino-2-methylphenol, 4-amino-2-hydroxymethylphenol, 4-amino-2-methoxymethylphenol, 4-amino-2-aminomethylphenol, 4-amino-2-(β-hydroxyethyl-aminomethyl)phenol and 4-amino-2-fluorophenol, and the addition salts thereof with an acid.

Among the ortho-aminophenols that may be mentioned, for example, are 2-aminophenol, 2-amino-5-methylphenol, 2-amino-6-methylphenol and 5-acetamido-2-aminophenol, and the addition salts thereof with an acid.

Among the heterocyclic bases that may be mentioned, for example, are pyridine derivatives, pyrimidine derivatives and pyrazole derivatives.

Among the pyridine derivatives that may be mentioned are the compounds described, for example, in patents GB 1 026 978 and GB 1 153 196, such as 2,5-diaminopyridine, 2-(4-methoxyphenyl)amino-3-aminopyridine, 2,3-diamino-6-methoxypyridine, 2-(β-methoxyethyl)amino-3-amino-6-methoxypyridine and 3,4-diaminopyridine, and the addition salts thereof with an acid.

Among the pyrimidine derivatives that can be mentioned are the compounds described, for example, in patents DE 2 359 399; JP 88-169 571; JP 05-163 124; EP 0 770 375 or patent application WO 96/15765, such as 2,4,5,6-tetraaminopyrimidine, 4-hydroxy-2,5,6-triaminopyrimidine, 2-hydroxy-4,5,6-triaminopyrimidine, 2,4-dihydroxy-5,6-diaminopyrimidine and 2,5,6-triaminopyrimidine, and pyrazolopyrimidine derivatives such as those mentioned in patent application FR-A-2 750 048 and among which mention may be made of pyrazolo[1,5-a]pyrimidine-3,7-diamine; 2,5-dimethylpyrazolo[1,5-a]pyrimidine-3,7-diamine; pyrazolo[1,5-a]pyrimidine-3,5-diamine; 2,7-dimethylpyrazolo[1,5-a]pyrimidine-3,5-diamine; 3-aminopyrazolo[1,5-a]pyrimidin-7-ol; 3-aminopyrazolo[1,5-a]pyrimidin-5-ol; 2-(3-aminopyrazolo[1,5-a]pyrimidin-7-ylamino)ethanol, 2-(7-aminopyrazolo[1,5-a]pyrimidin-3-ylamino)ethanol, 2-[(3-aminopyrazolo[1,5-a]pyrimidin-7-yl) (2-hydroxyethyl) amino]ethanol, 2-[(7-aminopyrazolo[1,5-a]pyrimidin-3-yl) (2-hydroxyethyl)amino]ethanol, 5,6-dimethylpyrazolo[1,5-a]-pyrimidine-3,7-diamine, 2,6-dimethylpyrazolo-[1,5-a] pyrimidine-3,7-diamine, 2,5,N7,N7-tetramethyl-pyrazolo[1,5-a]pyrimidine-3,7-diamine and 3-amino-5-methyl-7-imidazolylpropylaminopyrazolo[1,5-a]pyrimidine, and the addition salts thereof with an acid and the tautomeric forms thereof, when a tautomeric equilibrium exists.

Among the pyrazole derivatives that may be mentioned are the compounds described in patents DE 3 843 892 and DE 4 133 957 and patent applications WO 94/08969, WO 94/08970, FR-A-2 733 749 and DE 195 43 988, such as 4,5-diamino-1-methylpyrazole, 4,5-diamino-1-(β-hydroxyethyl)pyrazole, 3,4-diaminopyrazole, 4,5-diamino-1-(4'-chlorobenzyl)pyrazole, 4,5-diamino-1,3-dimethylpyrazole, 4,5-diamino-3-methyl-1-phenylpyrazole, 4,5-diamino-1-methyl-3-phenylpyrazole, 4-amino-1,3-dimethyl-5-hydrazinopyrazole, 1-benzyl-4,5-diamino-3-methylpyrazole, 4,5-diamino-3-tert-butyl-1-methylpyrazole, 4,5-diamino-1-tert-butyl-3-methylpyrazole, 4,5-diamino-1-(β-hydroxyethyl)-3-methylpyrazole, 4,5-diamino-1-ethyl-3-methylpyrazole, 4,5-diamino-1-ethyl-3-(4'-methoxyphenyl)pyrazole, 4,5-diamino-1-ethyl-3-hydroxymethylpyrazole, 4,5-diamino-3-hydroxymethyl-1-methylpyrazole, 4,5-diamino-3-hydroxymethyl-1-isopropylpyrazole, 4,5-diamino-3-methyl-1-isopropylpyrazole, 4-amino-5-(2'-aminoethyl)amino-1,3-dimethylpyrazole, 3,4,5-triaminopyrazole, 1-methyl-3,4,5-triaminopyrazole, 3,5-diamino-1-methyl-4-methylaminopyrazole and 3,5-diamino-4-(β-hydroxyethyl) amino-1-methylpyrazole, and the addition salts thereof with an acid.

The composition according to the invention may also contain one or more couplers conventionally used for dyeing keratin fibers. Among these couplers, mention may be made especially of meta-phenylenediamines, meta-aminophenols, meta-diphenols, naphthalene-based couplers and heterocyclic couplers.

Examples that may be mentioned include 2-methyl-5-aminophenol, 5-N-(β-hydroxyethyl)amino-2-methylphenol, 6-chloro-2-methyl-5-aminophenol, 3-aminophenol, 1,3-dihydroxybenzene, 1,3-dihydroxy-2-methylbenzene, 4-chloro-1,3-dihydroxybenzene, 2,4-diamino-1-(β-hydroxyethyloxy)benzene, 2-amino-4-(β-hydroxyethylamino)-1-methoxybenzene, 1,3-diaminobenzene, 1,3-bis(2,4-diaminophenoxy)propane, 3-ureidoaniline, 3-ureido-1-dimethylaminobenzene, sesamol, 1-β-hydroxyethylamino-3,4-methylenedioxybenzene, α-naphthol, 2-methyl-1-naphthol, 6-hydroxyindole, 4-hydroxyindole, 4-hydroxy-N-methylindole, 2-amino-3-hydroxypyridine, 6-hydroxybenzomorpholine, 3,5-diamino-2,6-dimethoxypyridine, 1-N-(β-hydroxyethyl)amino-3,4-methylenedioxybenzene and 2,6-bis(β-hydroxy-ethylamino)toluene and the addition salts thereof with an acid.

In the composition of the present invention, the coupler(s) is(are) generally present in an amount ranging from 0.001% to 10% by weight approximately, and more preferably from 0.005% to 6% by weight, relative to the total weight of the dye composition. The oxidation base(s) is(are) present in an amount preferably ranging from 0.001% to 10% by weight approximately, and more preferably from 0.005% to 6% by weight, relative to the total weight of the dye composition.

In general, the addition salts with an acid that may be used in the context of the dye compositions of the invention for the oxidation bases and couplers are chosen especially from the hydrochlorides, hydrobromides, sulfates, citrates, succinates, tartrates, lactates, tosylates, benzenesulfonates, phosphates and acetates.

The medium that is suitable for dyeing, also known as the dye support, generally consists of water or a mixture of water and at least one organic solvent to dissolve the compounds which would not be sufficiently soluble in water. As organic solvent, mention may be made, for example, of $C_1$-$C_4$ lower alkanols, such as ethanol and isopropanol; polyols and polyol ethers such as 2-butoxyethanol, propylene glycol, propylene glycol monomethyl ether, diethylene glycol monoethyl ether and monomethyl ether, as well as aromatic alcohols such as benzyl alcohol or phenoxyethanol, and mixtures thereof.

The organic solvents may preferably be present in proportions of between 1% and 40% by weight approximately relative to the total weight of the dye composition, and even more preferably between 5% and 30% by weight approximately.

The dye composition in accordance with the invention can also contain various adjuvants conventionally used in compositions for dyeing the hair, such as anionic, cationic, nonionic, amphoteric or zwitterionic surfactants or mixtures thereof, anionic, cationic, nonionic, amphoteric or zwitterionic polymers or mixtures thereof, inorganic or organic thickeners, and in particular anionic, cationic, nonionic or amphoteric associative polymeric thickeners, antioxidants, penetration agents, sequestering agents, fragrances, buffers, dispersing agents, packaging agents such as, for example, silicones, which may or may not be volatile or modified, film-forming agents, ceramides, preserving agents and opacifiers.

The above adjuvants are generally present in an amount for each of them of between 0.01% and 20% by weight relative to the weight of the composition.

Needless to say, a person skilled in the art will take care to select this or these optional additional compounds such that the advantageous properties intrinsically associated with the oxidation dye composition in accordance with the invention are not, or are not substantially, adversely affected by the addition(s) envisaged.

The pH of the dye composition in accordance with the invention is generally between about 3 and 12 and preferably between about 5 and 11. It may be adjusted to the desired value using acidifying or basifying agents usually used in the dyeing of keratin fibers, or alternatively using standard buffer systems.

Among the acidifying agents which may be mentioned, for example, are inorganic or organic acids such as hydrochloric acid, orthophosphoric acid, sulfuric acid, carboxylic acids such as acetic acid, tartaric acid, citric acid and lactic acid, and sulfonic acids.

Among the basifying agents which may be mentioned, for example, are aqueous ammonia, alkaline carbonates, alkanolamines such as mono-, di- and triethanolamine and derivatives thereof, sodium hydroxide, potassium hydroxide and the compounds of formula (III) below:

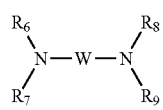

(III)

in which W is a propylene residue which is unsubstituted or substituted with a hydroxyl group or a $C_1$-$C_4$ alkyl radical; $R_6$, $R_7$, $R_8$ and $R_9$, which may be identical or different, represent a hydrogen atom, a $C_1$-$C_4$ alkyl radical or a $C_1$-$C_4$ hydroxyalkyl radical.

The dye composition according to the invention may be in various forms, such as in the form of liquids, creams or gels, or in any other form that is suitable for dyeing keratin fibers, and especially human hair.

A subject of the invention is also a process of direct dyeing, which comprises the application of a dye composition comprising a dye of formula (I) as defined above to keratin fibers. After a leave-in time, the keratin fibers are rinsed, revealing colored fibers.

The dye composition comprising the cationic azo dye of formula (I) may be applied to the fibers in the presence of an oxidizing agent, which causes bleaching of the fiber (lightening direct dyeing). This oxidizing agent may be added to the composition comprising the cationic azo dye at the time of use or directly onto the keratin fiber.

A subject of the invention is also a process of oxidation dyeing, which comprises the application to the fibers of a dye composition comprising a dye of formula (I), at least one oxidation base and optionally at least one coupler, in the presence of an oxidizing agent.

The oxidation base, the coupler and the oxidizing agent are as defined above.

The color may be revealed at acidic, neutral or alkaline pH and the oxidizing agent may be added to the composition of the invention just at the time of use, or it may be introduced using an oxidizing composition containing it, applied to the fibers simultaneously with or sequentially to the dye composition.

In the case of oxidation dyeing or lightening direct dyeing, the dye composition is mixed, preferably at the time of use, with a composition containing, in a medium that is suitable for dyeing, at least one oxidizing agent, this oxidizing agent being present in an amount that is sufficient to develop a coloration. The mixture obtained is then applied to the keratin fibers. After a leave-in time of 3 to 50 minutes approximately and preferably 5 to 30 minutes approximately, the keratin fibers are rinsed, washed with shampoo, rinsed again and then dried.

The oxidizing composition may also contain various adjuvants conventionally used in compositions for dyeing the hair, and as defined above.

The pH of the oxidizing composition containing the oxidizing agent is such that, after mixing with the dye composition, the pH of the resulting composition applied to the keratin fibers preferably ranges from 3 to 12 approximately, and even more preferably between 5 and 11. It may be adjusted to the desired value by means of acidifying or basifying agents usually used in the dyeing of keratin fibers, and as defined above.

The composition that is finally applied to the keratin fibers may be in various forms, such as in the form of liquids, creams or gels or in any other form that is suitable for dyeing keratin fibers, and especially human hair.

Another subject of the invention is a multi-compartment device or dyeing "kit", in which a first compartment contains the dye composition of the invention and a second compartment contains the oxidizing composition. This device may be equipped with a means for applying the desired mixture to the hair, such as the devices described in patent FR-2 586 913 in the name of the Applicant.

Finally, a subject of the invention is also novel dicationic diazo dyes of formula (I) as defined above, for which, when p=1,
$W_1$ to $W_5$ and L have the same meanings as defined above, when p=0,
$W_3$ represents an oxygen atom and the other groups of formula (I) have the same meanings as defined above, or $W_3$ represents a radical —$NR_{14}$— and L represents an aryl or heteroaryl radical optionally substituted with one or more radicals chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals, or a halogen atom such as chlorine, fluorine or bromine.

Synthesis of the Compounds of the Invention

The methods for obtaining said compounds are based on reactions that are already well known in the literature and disclosed, for example, in the following documents: U.S. Pat. No. 3,291,788, GB-1 186 753, U.S. Pat. No. 3,271,383, EP-0 757 083 and U.S. Pat. No. 5,708,151.

A first synthetic principle consists in starting with a 5- or 6-membered amino heterocycle, such as 3-aminotriazole, 2-aminothiazole, 3-aminothiadiazole, 2-aminopyridine or 2-aminopyridazine, which is reacted with sodium nitrite in a polar acidic protic solvent, such as acetic acid or hydrochloric acid, at a temperature generally of between –10° C. and 50° C., in order to generate the corresponding diazonium salt. This salt then reacts with an aromatic derivative of formula (A) or (B) described below, in which:

$W_3$, $W_5$, $X_1$, $X_2$ and L have the meanings described above according to the invention. These aromatic derivatives are obtained by applying the conventional SNAr (aromatic nucleophilic substitution), SN1 (nucleophilic substitution 1) and SN2 (nucleophilic substitution 2) reactions of the literature.

The resulting condensation product then reacts with an alkylating agent such as a dialkyl sulfate or an alkyl halide in a polar solvent and at a temperature of between 0° C. and 150° C. and preferably between 20° C. and 100° C. The 5- or 6-membered heterocyclic part is thus quaternized and the azo compound obtained is cationic.

With a 5-membered heterocycle:

A second synthetic principle consists in reacting a heterocyclic azo compound 1 quaternized on one of the nitrogen atoms of the heterocycle as a 4-methoxyphenylazo series, with an aniline or phenol derivative or a heteroaromatic amine 2 in a protic solvent at a temperature of between 25° C. and 150° C. In particular, the quaternary heterocycle may be a triazolium, thiazolium, thia-

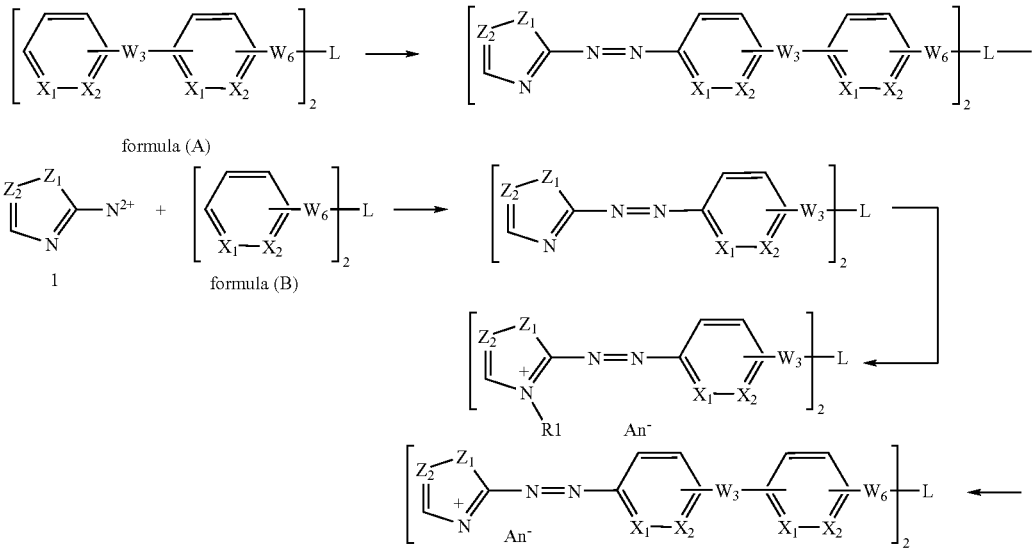

With a 6-membered heterocycle:

diazolium or oxazolium. The same synthetic principle

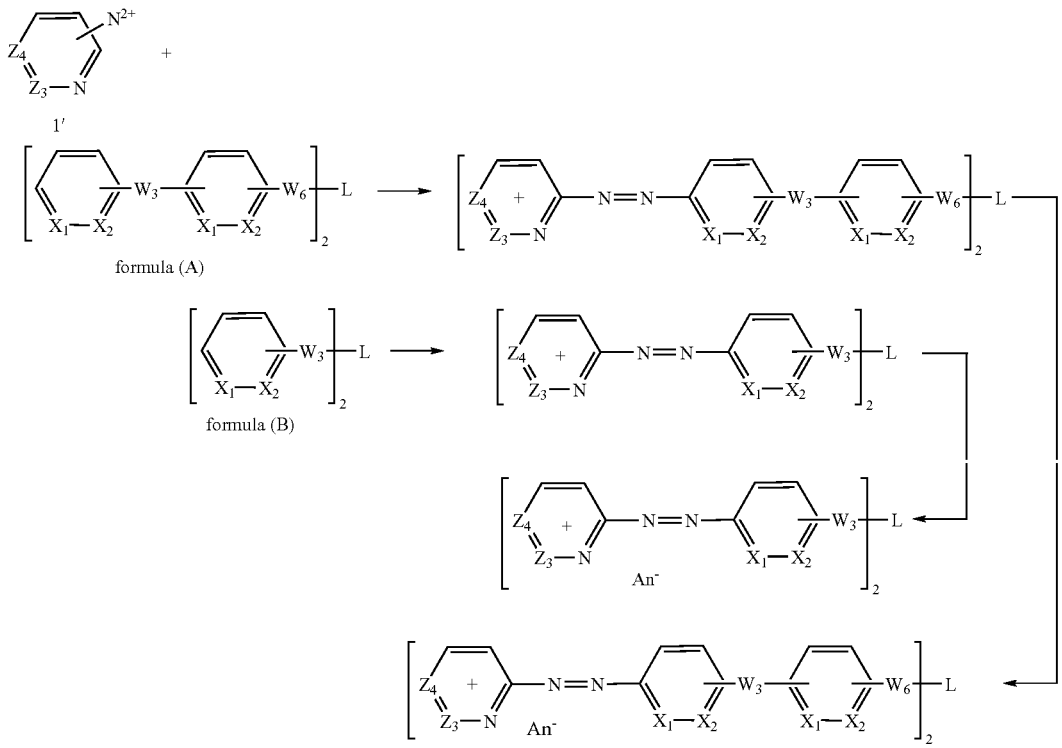

may be applied in the 6-membered heterocyclic series, such as pyridinium or pyridazinium, giving the compounds of formula 4' from the azo compound 1'.

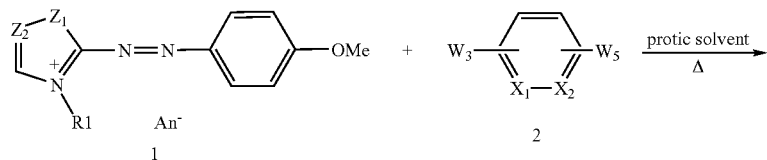

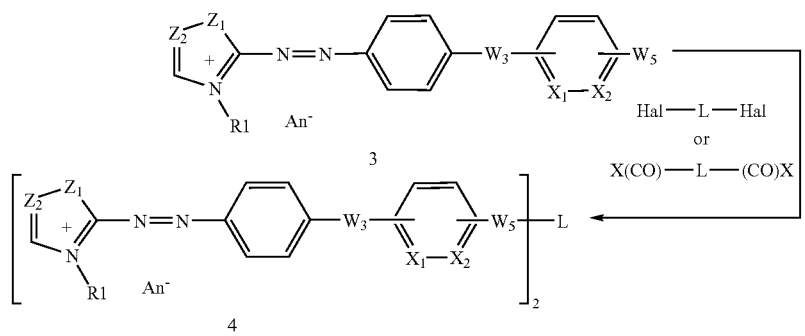

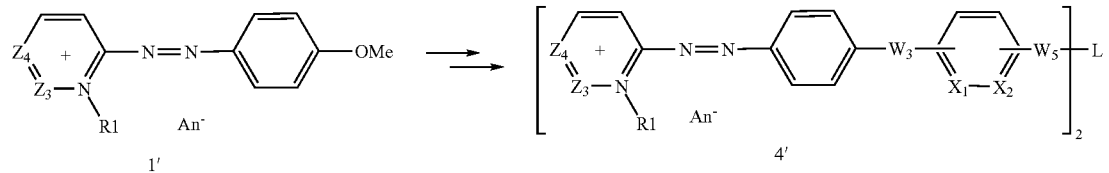

The cationic azo derivative 3 then reacts with a di-electrophile such as an alkyl dihalide, an alkylaryl dihalide, a triazine dihalide, a pyrimidine dihalide or a diacyl chloride, to give the cationic azo compound 4.

In the particular case in which $W_5$ represents an amino, the derivative 3 may react with an aryl dihalide in the presence of a transition metal such as palladium (II) or copper (I) to give compound 4 according to the Buchwald or Meerwein reaction, which are well known in the literature.

A third synthetic principle consists in reacting a heterocyclic azo compound 1 quaternized on one of the nitrogen atoms of the heterocycle as a 4-methoxyphenylazo series, with a diamino derivative of the type $W_3$-L-$W_3$ (in which $W_3$=$NH_2$) in a protic solvent at a temperature of between 25° C. and 150° C. In particular, the quaternary heterocycle may be a triazolium, thiazolium, thiadiazolium or oxazolium. The compounds of formula 5 are thus obtained. The same synthetic principle may be applied in the 6-membered heterocyclic series, such as pyridinium or pyridazinium, to give the compounds of formula 5' from the azo compound 1'.

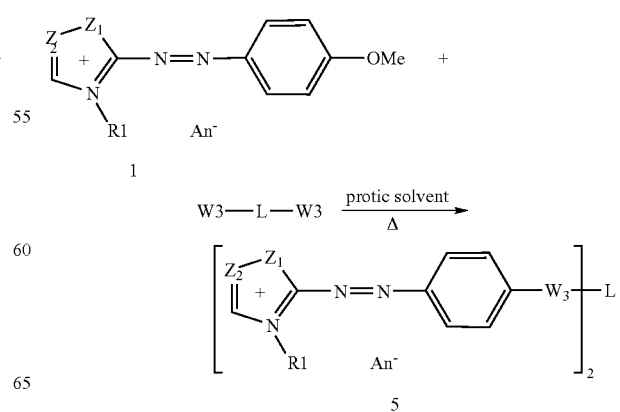

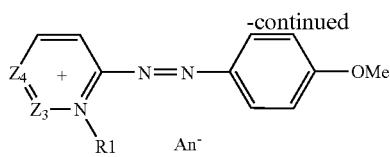
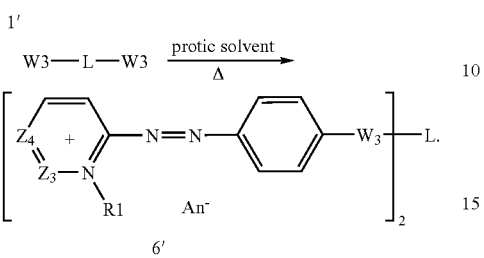
In the formulae of the synthetic scheme, Me denotes a CH₃ radical.
EXAMPLE OF SYNTHESIS
Compound b having the formula below in accordance with the invention is obtained according to process 1 or process 2 below (in which Me denotes a CH₃ radical)
Process 1:
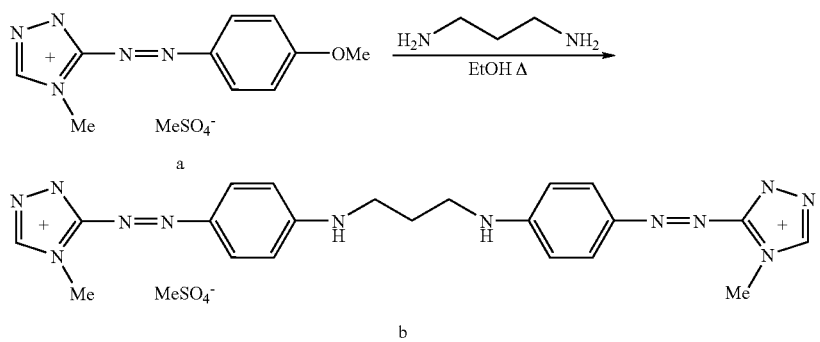
Process 2:
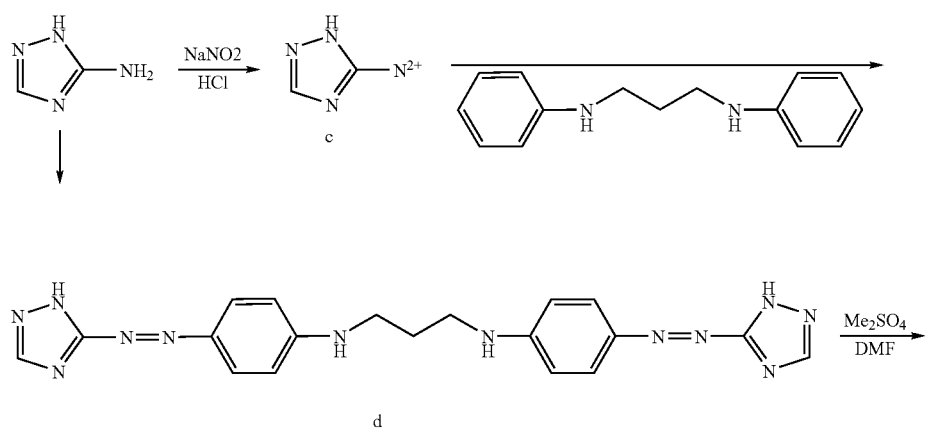
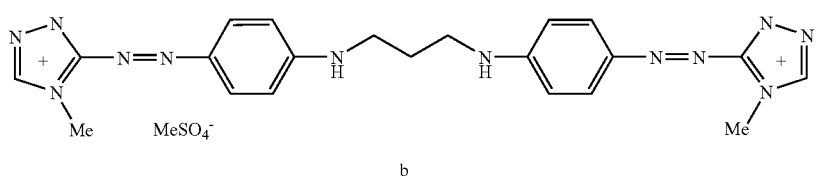

The diazonium salt of 3-aminotriazole (0.5 mmol) is prepared according to the protocol described in patent GB-1 186 753 or U.S. Pat. No. 3,291,788. A solution of 1 mmol of bis(N-phenylamino)propane in 10 ml of 15% sulfuric acid is added at 0° C. to the diazonium salt prepared above with vigorous stirring. After disappearance of the reagents, the reaction medium is poured onto ice and the precipitate is filtered off by suction, washed with water and then dried to constant weight to give compound d.

Compound d (0.2 mmol) is then dissolved in 30 ml of dimethylformamide and 1 mmol of dimethyl sulfate is added to this solution. The reaction medium is then brought to 90-100° C. with stirring. After 6 hours, the reaction medium is poured into 100 ml of water at room temperature and the solution is concentrated to dryness to constant weight to give 0.04 mmol of the desired compound b, the $\lambda_{max}$ of which is 520 nm in a methanolic 1% acetic acid solution.

The dye obtained dyed hair in an iridescent red shade.

The invention claimed is:

1. A method of dyeing human keratin fibers, comprising applying to the keratin fibers a composition comprising:

a cosmetic medium suitable for dyeing human keratin fibers, wherein said medium is water or a mixture of water and at least one organic solvent suitable for dyeing human keratin fibers, and at least one dicationic diazo dye of formula (I), comprised in said medium:

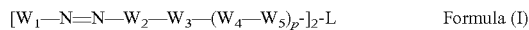

wherein:

p=0 or 1, $W_1$ is chosen from heteroaromatic radicals of formulae (II) and (III):

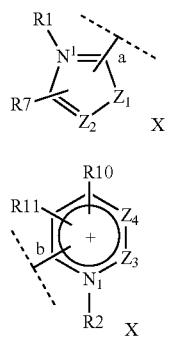

$W_2$ is chosen from carbon-based, pyridine-based and pyridazine-based aromatic groups of formula (IV):

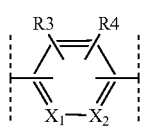

$W_3$ and $W_5$, which may be identical or different, are chosen from —$NR_{14}$— radicals, and oxygen and nitrogen atoms, $W_4$ is chosen from saturated and unsaturated, linear and branched $C_1$-$C_{16}$ hydrocarbon-based chains, which can form at least one 3- to 6-membered carbon-based ring, wherein at least one carbon atom of the carbon-based chain may optionally be replaced with an entity chosen from oxygen, nitrogen and sulfur atoms and from $SO_2$ groups, and further wherein the carbon atoms may optionally be substituted, independently of each other, with at least one halogen atom, provided that $W_4$ does not comprise a peroxide bond or diazo or nitroso radicals; piperazine rings; and groups of formula (V):

wherein in formulae (II), (III), (IV) and (V):

$X_1$ is chosen from nitrogen atoms and $CR_5$ radicals, $X_2$ is chosen from nitrogen atoms and $CR_6$ radicals, $X_3$ is chosen from nitrogen atoms and $CR_{17}$ radicals, $X_4$ is chosen from nitrogen atoms and $CR_{18}$ radicals, $Z_1$ is chosen from oxygen and sulfur atoms, and $NR_8$ radicals, $Z_2$ is chosen from nitrogen atoms and $CR_9$ atoms, with the proviso that when $Z_1$ is chosen from $NR_8$ radicals, $Z_2$ is not chosen from $CR_9$ radicals, such that formula (II) is not an imidazolium ring, $Z_3$ is chosen from nitrogen atoms and $CR_{12}$ radicals, $Z_4$ is chosen from nitrogen atoms and $CR_{13}$ radicals, the bond a of the 5-membered cationic ring of formula (II) is linked to the azo group of formula (I), the bond b of the 6-membered cationic ring of formula (III) is linked to the azo group of formula (I), wherein when p=0, then L is chosen from linear and branched $C_1$-$C_{16}$ hydrocarbon-based chains, which can form at least one 3- to 6-membered carbon-based ring, wherein at least one carbon atom of the carbon-based chain is optionally replaced with an entity chosen from oxygen, nitrogen and sulfur atoms and from $SO_2$ groups, and further wherein the carbon atoms of the chain are optionally substituted, independently of each other, with at least one halogen atom; with the proviso that L does not comprise a peroxide bond or diazo or nitroso radicals, wherein when p=1, then L is chosen from saturated and unsaturated, linear and branched $C_1$-$C_{16}$ hydrocarbon-based chains, which can form at least one 3 to 6 membered carbon-based ring, wherein at least one carbon atom of the carbon-based chain is optionally replaced with an entity chosen from oxygen, nitrogen and sulfur atoms and from $SO_2$ groups; with the proviso that L does not comprise a peroxide bond or diazo or nitroso radicals, $R_3$, $R_4$, $R_5$, $R_6$, $R_7$, $R_9$, $R_{10}$, $R_{11}$, $R_{12}$, $R_{13}$, $R_{14}$, $R_{15}$, $R_{16}$, $R_{17}$ and $R_{18}$ which may be identical or different, are chosen from hydrogen atoms, saturated and unsaturated, linear and branched $C_1$-$C_{16}$ hydrocarbon-based chains, which can form at least one 3- to 6-membered carbon-based ring, wherein at least one carbon atom of the carbon-based chain is optionally replaced with an entity chosen from oxygen, nitrogen and sulfur atoms, and from $SO_2$ groups, and the carbon atoms of the chain are optionally substituted, independently of each other, with at least one halogen atom; and with the proviso that $R_3$, $R_4$, $R_5$, $R_6$, $R_7$, $R_9$, $R_{10}$, $R_{11}$, $R_{12}$, $R_{13}$, $R_{14}$, $R_{15}$, $R_{16}$, $R_{17}$ and $R_{18}$ do not comprise a peroxide bond or diazo or nitroso radicals, $R_3$ with $R_4$, $R_7$ with $R_9$, $R_{10}$ with $R_{11}$, $R_{12}$ with $R_{13}$ and $R_{15}$ with $R_{16}$ may optionally form a carbon-based aromatic ring, $R_1$, $R_2$ and $R_8$ are chosen from linear and branched $C_1$-$C_8$ alkyl radicals optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals; and optionally substituted phenyl radicals, and X is chosen from organic and mineral anions.

2. The method according to claim 1, wherein the human keratin fibers are hair.

3. The method according to claim 1, wherein $R_3$, $R_4$, $R_5$, $R_6$, $R_{10}$, $R_{11}$, $R_{12}$, $R_{13}$, $R_{15}$, $R_{16}$, $R_{17}$ and $R_{18}$, which may be identical or different, are chosen from hydrogen atoms; linear and branched $C_1$-$C_4$ alkyl radicals, optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals; phenyl radicals optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals, and halogen atoms; carboxyl radicals; sulfonylamino radicals; sulfonic radicals; $C_1$-$C_2$ alkoxy radicals; $C_2$-$C_4$ (poly)hydroxyalkoxy radicals; amino radicals; $C_1$-$C_2$ (di)alkylamino radicals; and $C_2$-$C_4$ (poly)hydroxyalkylamino radicals.

4. The method according to claim 3, wherein $R_3$, $R_4$, $R_5$, $R_6$, $R_{10}$, $R_{11}$, $R_{12}$, $R_{13}$, $R_{15}$, $R_{16}$, $R_{17}$ and $R_{18}$ are chosen from hydrogen atoms; $C_1$-$C_4$ alkyl radicals optionally substituted with at least one radical chosen from hydroxyl, amino and $C_1$-$C_2$ (di)alkylamino radicals; carboxyl radicals; $C_1$-$C_2$ alkoxy radicals; amino radicals; $C_1$-$C_2$ (di)alkylamino radicals; and $C_2$-$C_4$ (poly)hydroxyalkylamino radicals.

5. The method according to claim 4, wherein $R_3$, $R_4$, $R_5$, $R_6$, $R_{10}$, $R_{11}$, $R_{12}$, $R_{13}$, $R_{15}$, $R_{16}$, $R_{17}$ and $R_{18}$ are chosen from hydrogen atoms; methyl, phenyl and 2-hydroxymethyl radicals; carboxyl, methoxy, ethoxy and 2-hydroxyethyloxy radicals; and amino, methylamino, dimethylamino and 2-hydroxyethylamino radicals.

6. The method according to claim 1, wherein $R_7$ and $R_9$, which may be identical or different, are chosen from hydrogen atoms; linear and branched $C_1$-$C_4$ alkyl radicals optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals; optionally substituted phenyl radicals; carboxyl radicals; and sulfonylamino radicals.

7. The method according to claim 6, wherein $R_7$ and $R_9$ are chosen from hydrogen atoms; phenyl radicals and $C_1$-$C_4$ alkyl radicals optionally substituted with at least one radical chosen from hydroxyl, amino, $C_1$-$C_2$ (di)alkylamino and carboxyl radicals.

8. The method according to claim 7, wherein $R_7$ and $R_9$ are chosen from hydrogen atoms; methyl, phenyl and 2-hydroxymethyl radicals; and carboxyl radicals.

9. The method according to claim 1, wherein $R_{14}$ is chosen from hydrogen atoms; linear and branched $C_1$-$C_6$ alkyl radicals, optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals; and optionally substituted phenyl radicals.

10. The method according to claim 9, wherein $R_{14}$ is chosen from hydrogen atoms; linear and branched $C_1$-$C_4$ alkyl radicals, optionally substituted with at least one radical chosen from hydroxyl, $C_1$-$C_2$ alkoxy, amino and $C_1$-$C_2$ (di)alkylamino radicals.

11. The method according to claim 10, wherein $R_{14}$ is chosen from hydrogen atoms; methyl, ethyl, 2-hydroxyethyl, 2-aminoethyl, 2-methoxyethyl, 1-carboxymethyl, 2-carboxyethyl and 2-sulfonylethyl radicals.

12. The method according to claim 11, wherein $R_{14}$ is chosen from hydrogen atoms; methyl, ethyl, 2-hydroxyethyl and 2-aminoethyl radicals.

13. The method according to claim 1, wherein $R_1$, $R_2$ and $R_8$ are chosen from $C_1$-$C_4$ alkyl radicals optionally substituted with at least one radical chosen from hydroxyl, $C_1$-$C_2$ alkoxy, amino, $C_1$-$C_2$ (di)alkylamino, carboxyl and sulfonic radicals.

14. The method according to claim 13, wherein $R_1$, and $R_2$ and $R_8$ are chosen from methyl, ethyl, 2-hydroxyethyl, 1-carboxymethyl, 2-carboxyethyl and 2-sulfonylethyl radicals.

15. The method according to claim 1, wherein $W_1$ is chosen from triazolium, thiazolium and pyridinium cationic groups of formulae (II) and (III), wherein $R_1$ and $R_2$ are chosen from linear and branched $C_1$-$C_8$ alkyl radicals optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals; and optionally substituted phenyl radicals, $R_7$ is chosen from hydrogen atoms; linear and branched $C_1$-$C_4$ alkyl radicals optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals; optionally substituted phenyl radicals; carboxyl radicals; and sulfonylamino radicals; and $R_{10}$, $R_{11}$, $R_{12}$ and $R_{13}$, which may be identical or different, are chosen from hydrogen atoms; linear and branched $C_1$-$C_4$ alkyl radicals, optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals; phenyl radicals optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals, and halogen atoms; carboxyl radicals; sulfonylamino radicals; sulfonic radicals; $C_1$-$C_2$ alkoxy radicals; $C_2$-$C_4$ (poly)hydroxyalkoxy radicals; amino radicals; $C_1$-$C_2$ (di)alkylamino radicals; and $C_2$-$C_4$ (poly)hydroxyalkylamino radicals.

16. The method according to claim 1, wherein $W_2$ is chosen from phenyl and pyridyl groups of formula (IV), wherein $R_3$, $R_4$, $R_5$ and $R_6$, which may be identical or different, are chosen from hydrogen atoms; linear and branched $C_1$-$C_4$ alkyl radicals, optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals; phenyl radicals optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals, and halogen atoms; carboxyl radicals;

sulfonylamino radicals; sulfonic radicals; $C_1$-$C_2$ alkoxy radicals; $C_2$-$C_4$ (poly)hydroxyalkoxy radicals; amino radicals; $C_1$-$C_2$ (di)alkylamino radicals; and $C_2$-$C_4$ (poly)hydroxyalkylamino radicals.

17. The method according to claim 1, wherein $W_3$ and $W_5$, which may be identical or different, are chosen from —NR$_{14}$— groups, wherein R$_{14}$ is chosen from hydrogen atoms; linear and branched C$_1$-C$_6$ alkyl radicals, optionally substituted with at least one radical chosen from hydroxyl, C$_1$-C$_2$ alkoxy, C$_2$-C$_4$ (poly)hydroxyalkoxy, amino, C$_1$-C$_2$ (di)alkylamino, carboxyl and sulfonic radicals; and optionally substituted phenyl radicals.

18. The method according to claim 1, wherein W$_4$ is chosen from linear and branched C$_2$-C$_6$ alkyl radicals optionally substituted with at least one radical chosen from hydroxyl, C$_1$-C$_2$ alkoxy, C$_2$-C$_4$ (poly)hydroxyalkoxy, amino, C$_1$-C$_2$ (di)alkylamino, carboxyl and sulfonic radicals; phenyl radicals optionally substituted with at least one radical chosen from hydroxyl, C$_1$-C$_2$ alkoxy, C$_2$-C$_4$ (poly)hydroxyalkoxy, amino, C$_1$-C$_2$ (di)alkylamino, carboxyl and sulfonic radicals, and halogen atoms; naphthyl radicals optionally substituted with at least one radical chosen from hydroxyl, C$_1$-C$_2$ alkoxy, C$_2$-C$_4$ (poly)hydroxyalkoxy, amino, C$_1$-C$_2$ (di)alkylamino, carboxyl and sulfonic radicals; halogen atoms; and piperazine radicals formed with the two radicals W$_3$ and W$_5$.

19. The method according to claim 18, wherein W$_4$ is chosen from linear and branched C$_2$-C$_4$ alkyl radicals optionally substituted with at least one hydroxyl radical; phenyl radicals optionally substituted with at least one radical chosen from hydroxyl, C$_1$-C$_2$ alkoxy, C$_2$-C$_4$ (poly)hydroxyalkoxy, amino, C$_1$-C$_2$ (di)alkylamino, carboxyl and sulfonic radicals; naphthyl radicals optionally substituted with at least one radical chosen from hydroxyl, C$_1$-C$_2$ alkoxy, C$_2$-C$_4$ (poly)hydroxyalkoxy, amino, C$_1$-C$_2$ (di)alkylamino, carboxyl and sulfonic radicals; and piperazine radicals formed with the two radicals W$_3$ and W$_5$.

20. The method according to claim 19, wherein W$_4$ is chosen from ethyl, propyl, butyl and 2-hydroxypropyl radicals; phenyl radicals; naphthyl radicals; and piperazine rings formed with the two radicals W$_3$ and W$_5$.

21. The method according to claim 1, wherein L is an entity chosen from —CO—; —CO—CH$_2$—CH$_2$—CO—; —CO—CO—; benzo-1,4-dicarbonyl; ethyl; 1,4-phenyl; triazine; and pyrimidine.

22. The method according to claim 21, wherein L is chosen from ethyl and triazine groups.

23. The method according to claim 1, wherein the at least one dicationic diazo dye of formula (I) is present in an amount ranging from 0.001% to 5% by weight, relative to the total weight of the composition.

24. The method according to claim 23, wherein the at least one dicationic diazo dye of formula (I) is present in an amount ranging from 0.05% to 2% by weight, relative to the total weight of the composition.

25. The method according to claim 1 further comprising at least one oxidation base.

26. The method according to claim 25, wherein the at least one oxidation base is chosen from para-phenylenediamines, bis(phenyl)alkylenediamines, para-aminophenols, ortho-aminophenols, heterocyclic bases, and the acid addition salts thereof.

27. The method according to claim 25, wherein the at least one oxidation base is present in an amount ranging from 0.001% to 10% by weight, relative to the total weight of the composition.

28. The method according to claim 27, wherein the at least one oxidation base is present in an amount ranging from 0.005% to 6% by weight, relative to the total weight of the composition.

29. The method according to claim 1, further comprising at least one coupler.

30. The method according to claim 29, wherein the at least one coupler is chosen from meta-phenylenediamines, meta-aminophenols, meta-diphenols, naphthalene-based couplers, heterocyclic couplers, and the acid addition salts thereof.

31. The method according to claim 1 further comprising at least one additional direct dye, chosen from neutral, acidic and cationic nitrobenzene direct dyes; neutral, acidic and cationic azo direct dyes; quinone direct dyes; azine direct dyes; methine direct dyes; triarylmethane direct dyes; indoamine direct dyes; and natural direct dyes, with the proviso that the at least one additional direct dye is other than those of formula (I).

32. The method according to claim 31, wherein the at least one quinone direct dye is chosen from neutral, acidic and cationic anthraquinone direct dyes.

33. The method according to claim 1 further comprising at least one oxidizing agent.

34. The method according to claim 33, wherein the at least one oxidizing agent is hydrogen peroxide.

35. The method according to claim 1, wherein the dye composition comprises at least one oxidizing agent.

36. The method according to claim 35, wherein the at least one oxidizing agent is mixed with the dye composition at the time of use.

37. The method according to claim 35, wherein the at least one oxidizing agent is applied to the fibers in the form of an oxidizing composition either simultaneously with, or sequentially to, the application of the dye composition.

38. A process for the oxidation dyeing of human keratin fibers, comprising applying to the fibers, at least one dye composition in the presence of at least one oxidizing agent, wherein the at least one dye composition comprises at least one oxidation base, optionally at least one coupler, and at least one dicationic diazo dye of formula (I):

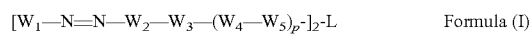

Formula (I)

wherein:

p=0 or 1,

W$_1$ is chosen from heteroaromatic radicals of formulae (II) and (III):

W$_2$ is chosen from carbon-based, pyridine-based and pyridazine-based aromatic groups of formula (IV):

W$_3$ and W$_5$, which may be identical or different, are chosen from —NR$_{14}$— radicals, and oxygen and nitrogen atoms, W$_4$ is chosen from saturated and unsaturated, linear and branched C$_1$-C$_{16}$ hydrocarbon-based chains, which can form at least one 3- to 6-membered carbon-based ring, wherein at least one carbon atom of the carbon-based chain may optionally be replaced with an entity chosen from oxygen, nitrogen and sulfur atoms, and from SO$_2$ groups, and further wherein the carbon atoms may optionally be substituted, independently of each other, with at least one halogen atom, provided that W$_4$ does not comprise a peroxide bond or diazo or nitroso radicals; piperazine rings; and groups of formula (V):

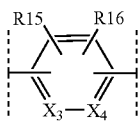

Formula (V)

wherein in formulae (II), (III), (IV) and (V):
X$_1$ is chosen from nitrogen atoms and CR$_5$ radicals,
X$_2$ is chosen from nitrogen atoms and CR$_6$ radicals,
X$_3$ is chosen from nitrogen atoms and CR$_{17}$ radicals,
X$_4$ is chosen from nitrogen atoms and CR$_{18}$ radicals,
Z$_1$ is chosen from oxygen and sulfur atoms, and NR$_8$ radicals,
Z$_2$ is chosen from nitrogen atoms and CR$_9$ atoms, with the proviso that when Z$_1$ is chosen from NR$_8$ radicals, then Z$_2$ is not chosen from CR$_9$ radicals, such that formula (II) is not an imidazolium ring,
Z$_3$ is chosen from nitrogen atoms and CR$_{12}$ radicals,
Z$_4$ is chosen from nitrogen atoms and CR$_{13}$ radicals,
the bond a of the 5-membered cationic ring of formula (II) is linked to the azo group of formula (I),
the bond b of the 6-membered cationic ring of formula (III) is linked to the azo group of formula (I),
wherein when p=0, then L is chosen from linear and branched C$_1$-C$_{16}$ hydrocarbon-based chains, which can form at least one 3- to 6-membered carbon-based ring, wherein at least one carbon atom of the carbon-based chain is optionally replaced with an entity chosen from oxygen, nitrogen and sulfur atoms, and from SO$_2$ groups, and further wherein the carbon atoms of the chain are optionally substituted, independently of each other, with at least one halogen atom;
with the proviso that L does not comprise a peroxide bond or diazo or nitroso radicals,
wherein when p=1, then L is chosen from saturated and unsaturated, linear and branched C$_1$-C$_{16}$ hydrocarbon-based chains, which can form at least one 3- to 6-membered carbon-based ring, wherein at least one carbon atom of the carbon-based chain is optionally replaced with an entity chosen from oxygen, nitrogen and sulfur atoms, and SO$_2$ groups; with the proviso that L does not comprise a peroxide bond or diazo or nitroso radicals,
R$_3$, R$_4$, R$_5$, R$_6$, R$_7$, R$_9$, R$_{10}$, R$_{11}$, R$_{12}$, R$_{13}$, R$_{14}$, R$_{15}$, R$_{16}$, R$_{17}$ and R$_{18}$, which may be identical or different, are chosen from hydrogen atoms, saturated and unsaturated, linear and branched C$_1$-C$_{16}$ hydrocarbon-based chains, which can form at least one 3- to 6-membered carbon-based ring, wherein at least one carbon atom of the carbon-based chain is optionally replaced with an entity chosen from oxygen, nitrogen and sulfur atoms, and from SO$_2$ groups, and the carbon atoms of the chain are optionally substituted, independently of each other, with at least one halogen atom; and with the proviso that R$_3$, R$_4$, R$_5$, R$_6$, R$_7$, R$_9$, R$_{10}$, R$_{11}$, R$_{12}$, R$_{13}$, R$_{14}$, R$_{15}$, R$_{16}$, R$_{17}$ and R$_{18}$ do not comprise a peroxide bond or diazo or nitroso radicals,
R$_3$ with R$_4$, R$_7$ with R$_9$, R$_{10}$ with R$_{11}$, R$_{12}$ with R$_{13}$ and R$_{15}$ with R$_{16}$ can optionally form a carbon-based aromatic ring,
R$_1$, R$_2$ and R$_8$ are chosen from linear and branched C$_1$-C$_8$ alkyl radicals optionally substituted with at least one radical chosen from hydroxyl, C$_1$-C$_2$ alkoxy, C$_2$-C$_4$ (poly)hydroxyalkoxy, amino, C$_1$-C$_2$ (di)alkylamino, carboxyl and sulfonic radicals; and optionally substituted phenyl radicals, and
X is chosen from organic and mineral anions.

39. The process according to claim 38, wherein the human keratin fibers are hair.

40. The process according to claim 38, wherein the at least one oxidizing agent is mixed with the dye composition at the time of use.

41. The process according to claim 38, wherein the at least one oxidizing agent is applied to the fibers in the form of an oxidizing composition either simultaneously with, or sequentially to, the application of the dye composition.

42. A multi-compartment kit, wherein at least one first compartment comprises a composition comprising at least one dicationic diazo dye of formula (I):

$$[W_1—N{=}N—W_2—W_3—(W_4—W_5)_p\text{-}]_2\text{-L}$$ Formula (I)

wherein:
p=0 or 1,
W$_1$ is chosen from heteroaromatic radicals of formulae (II) and (III):

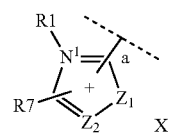

(II)

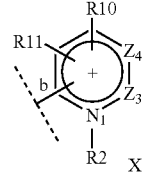

(III)

W$_2$ is chosen from carbon-based, pyridine-based and pyridazine-based aromatic groups of formula (IV):

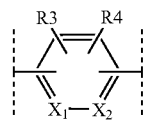

(IV)

W$_3$ and W$_5$, which may be identical or different, are chosen from —NR$_{14}$— radicals, and oxygen and nitrogen atoms, W$_4$ is chosen from saturated and unsaturated, linear and branched C$_1$-C$_{16}$ hydrocarbon-based chains, which can form at least one 3- to 6-membered carbon-based ring, wherein at least one carbon atom of the carbon-based chain may optionally be replaced with an entity chosen from oxygen, nitrogen and sulfur atoms and from $SO_2$ groups, and further wherein the carbon atoms may optionally be substituted, independently of each other, with at least one halogen atom, provided that $W_4$ does not comprise a peroxide bond or diazo or nitroso radicals; piperazine rings; and groups of formula (V):

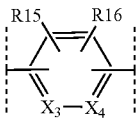

Formula (V)

wherein in formulae (II), (III), (IV) and (V):
$X_1$ is chosen from nitrogen atoms and $CR_5$ radicals,
$X_2$ is chosen from nitrogen atoms and $CR_6$ radicals,
$X_3$ is chosen from nitrogen atoms and $CR_7$ radicals,
$X_4$ is chosen from nitrogen atoms and $CR_{18}$ radicals,
$Z_1$ is chosen from oxygen and sulfur atoms, and $NR_8$ radicals,
$Z_2$ is chosen from nitrogen atoms and $CR_9$ atoms, with the proviso that when $Z_1$ is chosen from $NR_8$ radicals, then $Z_2$ is not chosen from $CR_9$ radicals, such that formula (II) is not an imidazolium ring,
$Z_3$ is chosen from nitrogen atoms and $CR_{12}$ radicals,
$Z_4$ is chosen from nitrogen atoms and $CR_{13}$ radicals,
the bond a of the 5-membered cationic ring of formula (II) is linked to the azo group of formula (I),
the bond b of the 6-membered cationic ring of formula (III) is linked to the azo group of formula (I),
wherein when p=0, then L is chosen from linear and branched $C_1$-$C_{16}$ hydrocarbon-based chains, which can form at least one 3- to 6-membered carbon-based ring, wherein at least one carbon atom of the carbon-based chain is optionally replaced with an entity chosen from oxygen, nitrogen and sulfur atoms, and from $SO_2$ groups, and further wherein the carbon atoms of the chain are optionally substituted, independently of each other, with at least one halogen atom; with the proviso that L does not comprise a peroxide bond or diazo or nitroso radicals,
wherein when p=1, then L is chosen from saturated and unsaturated, linear and branched $C_1$-$C_{16}$ hydrocarbon-based chains, which can form at least one 3- to 6-membered carbon-based ring, wherein at least one carbon atom of the carbon-based chain is optionally replaced with an entity chosen from oxygen, nitrogen and sulfur atoms, and from $SO_2$ groups; with the proviso that L does not comprise a peroxide bond or diazo or nitroso radicals,
$R_3$, $R_4$, $R_5$, $R_6$, $R_7$, $R_9$, $R_{10}$, $R_{11}$, $R_{12}$, $R_{13}$, $R_{14}$, $R_{15}$, $R_{16}$, $R_{17}$ and $R_{18}$, which may be identical or different, are chosen from hydrogen atoms, saturated and unsaturated, linear and branched $C_1$-$C_{16}$ hydrocarbon-based chains, which can form at least one 3- to 6-membered carbon-based ring, wherein at least one carbon atom of the carbon-based chain is optionally replaced with an entity chosen from oxygen, nitrogen and sulfur atoms, and from $SO_2$ groups, and the carbon atoms of the chain are optionally substituted, independently of each other, with at least one halogen atom; and with the proviso that $R_3$, $R_4$, $R_5$, $R_6$, $R_7$, $R_9$, $R_{10}$, $R_{11}$, $R_{12}$, $R_{13}$, $R_{14}$, $R_{15}$, $R_{16}$, $R_{17}$ and $R_{18}$ do not comprise a peroxide bond or diazo or nitroso radicals,
$R_3$ with $R_4$, $R_7$ with $R_9$, $R_{10}$ with $R_{11}$, $R_{12}$ with $R_{13}$ and $R_{15}$ with $R_{16}$ can optionally form a carbon-based aromatic ring,
$R_1$, $R_2$ and $R_8$ are chosen from linear and branched $C_1$-$C_8$ alkyl radicals optionally substituted with at least one radical chosen from hydroxyl, $C_1$-$C_2$ alkoxy, $C_2$-$C_4$ (poly)hydroxyalkoxy, amino, $C_1$-$C_2$ (di)alkylamino, carboxyl and sulfonic radicals; and optionally substituted phenyl radicals, and
X is chosen from organic and mineral anions; and
at least one second compartment comprises an oxidizing composition.

43. The method according to claim 1, wherein the dicationic diazo dyes of formula (I) are chosen from those of the following formulae:

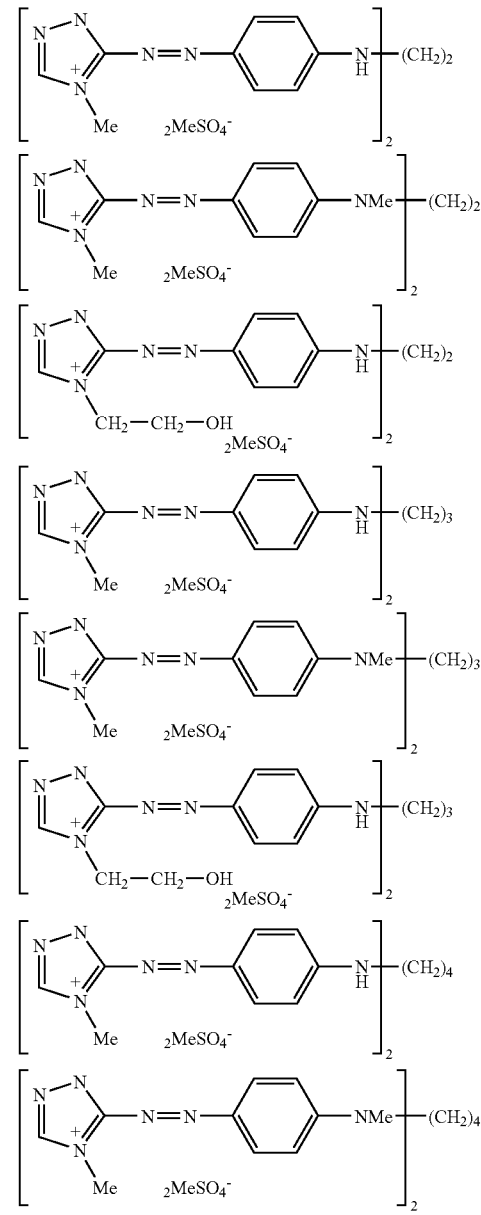

-continued

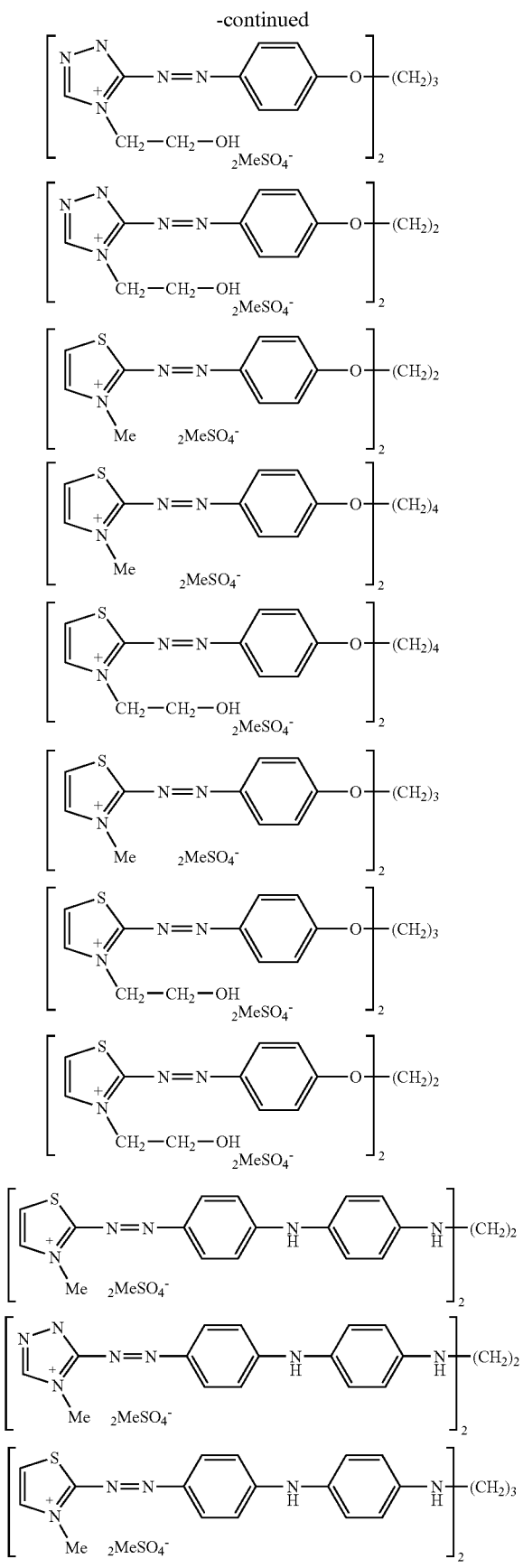
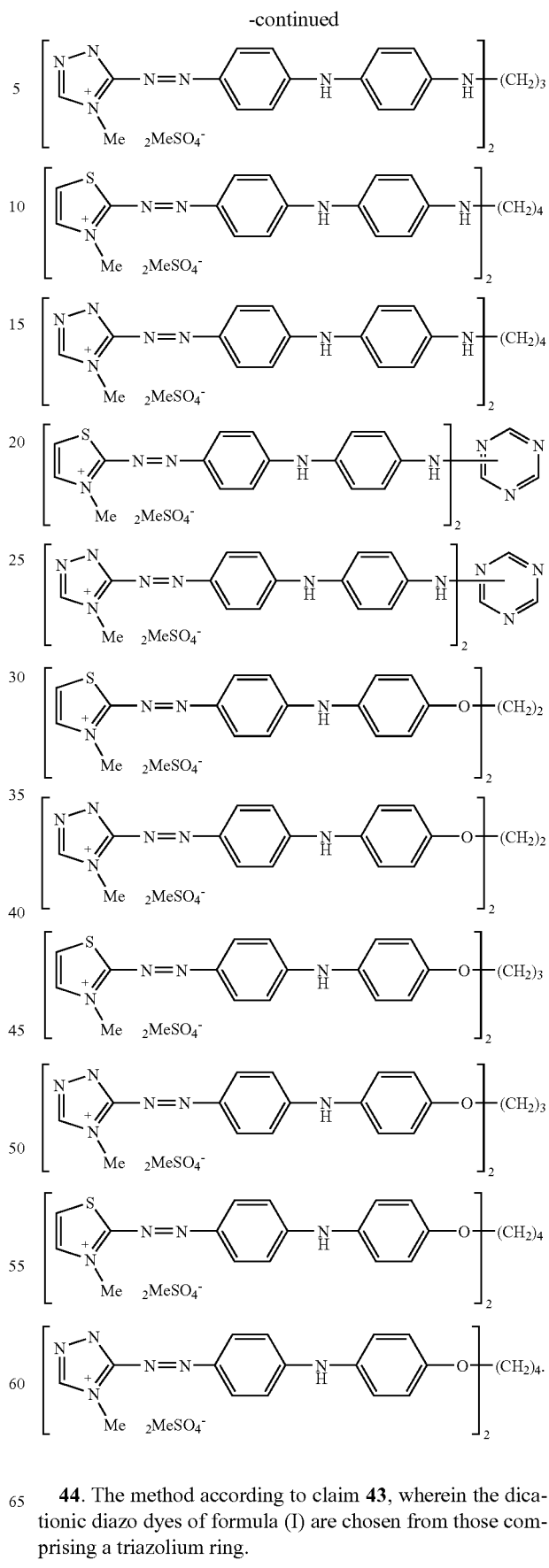
44. The method according to claim 43, wherein the dicationic diazo dyes of formula (I) are chosen from those comprising a triazolium ring.

45. A composition for dyeing human keratin fibers, comprising:

- a cosmetic medium suitable for dyeing human keratin fibers, wherein said medium is water or a mixture of water and at least one organic solvent suitable for dyeing human keratin fibers, and
- at least one dicationic diazo dye, comprised in said medium, chosen from those of the following formulae:

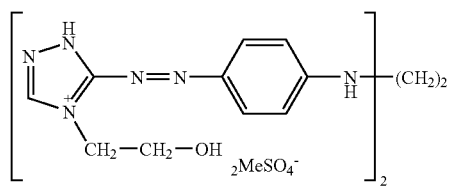

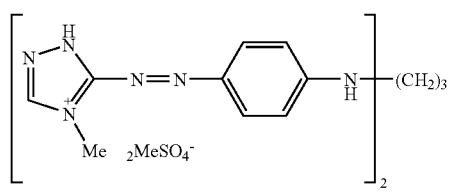

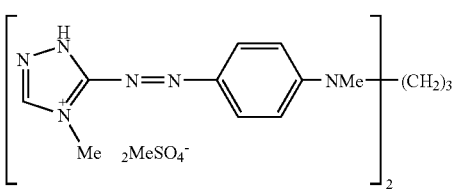

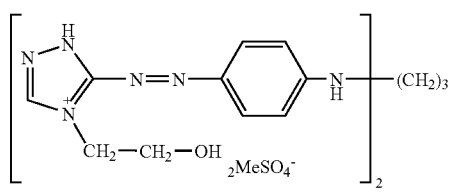

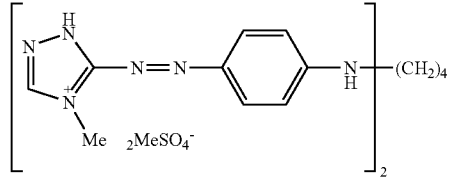

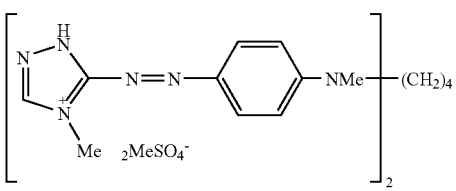

-continued

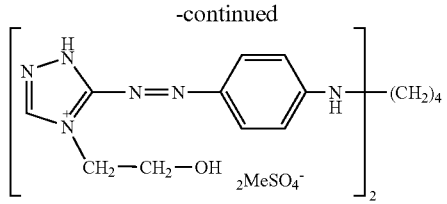

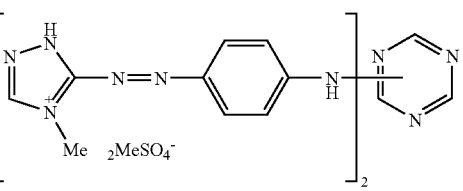

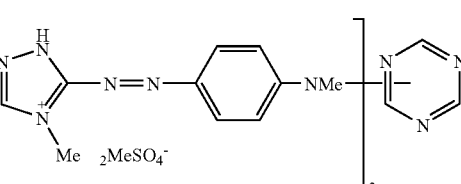

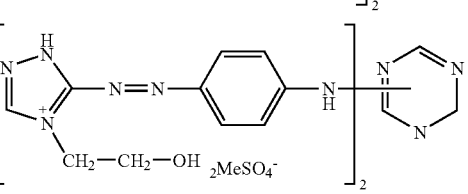

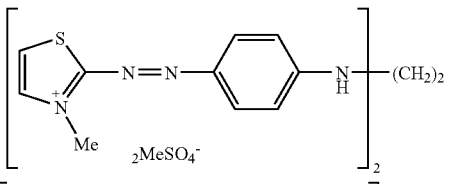

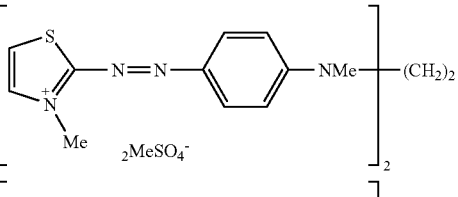

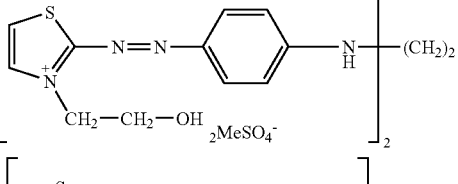

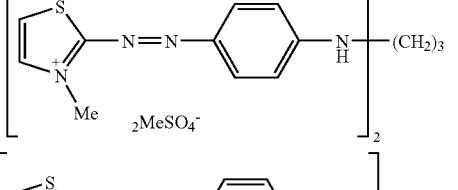

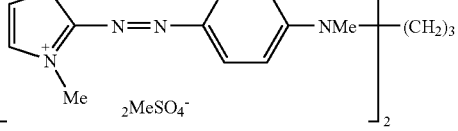

-continued
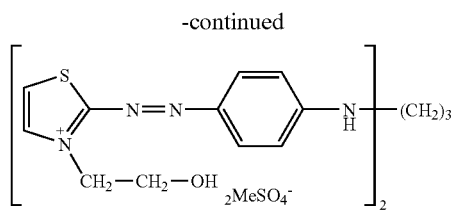
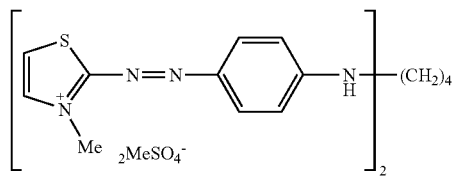
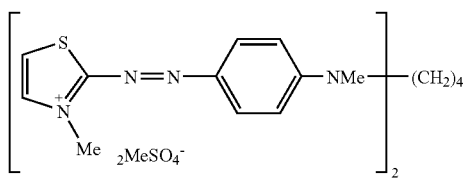
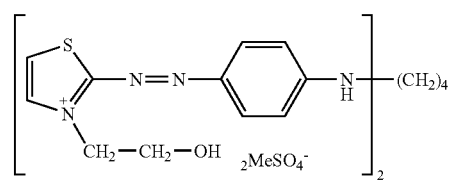
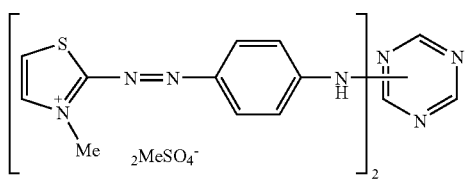
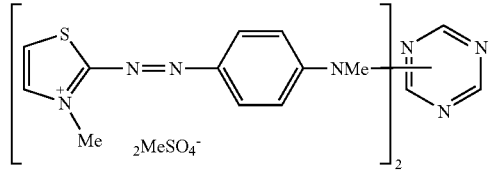
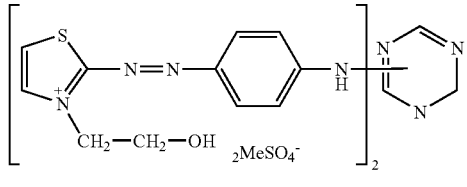
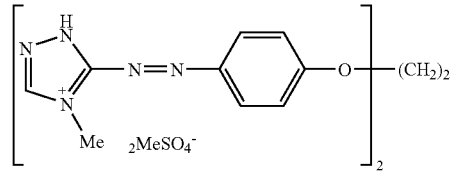
-continued
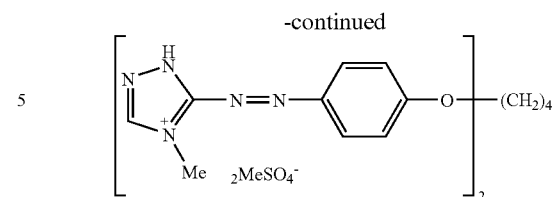
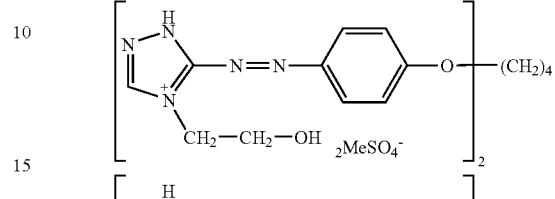
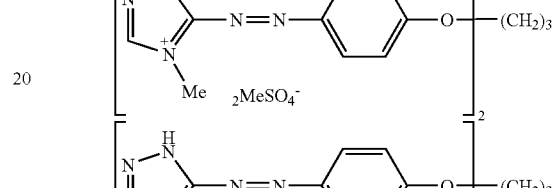
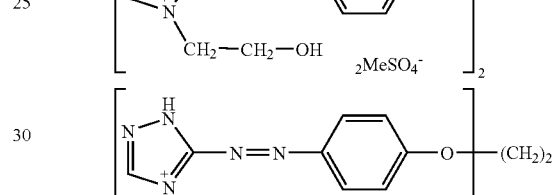
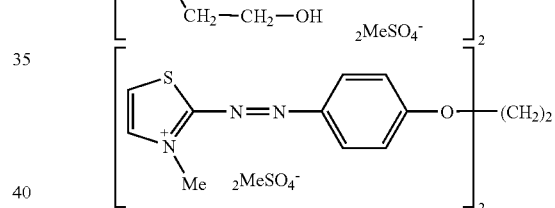
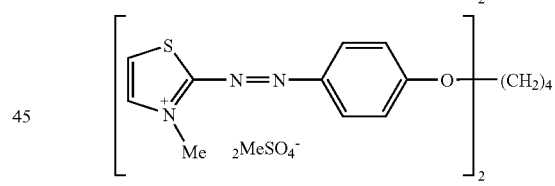
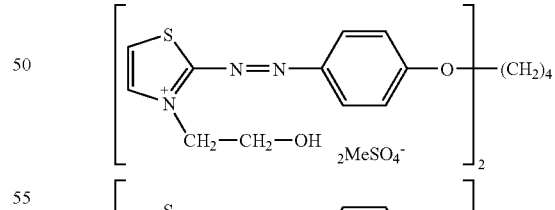
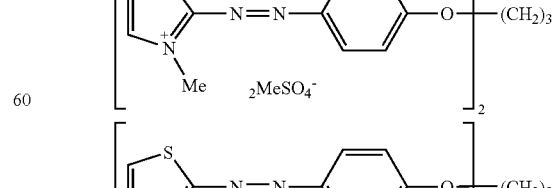
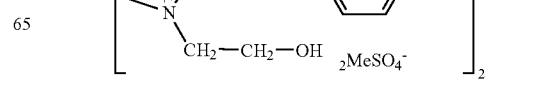

-continued
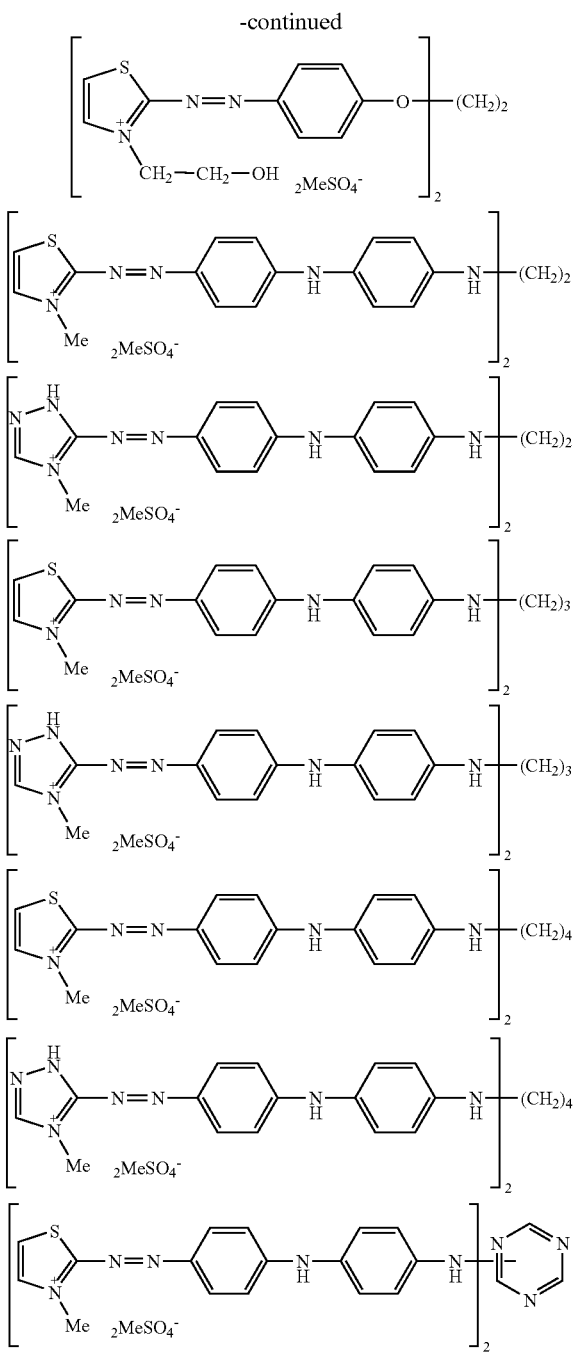
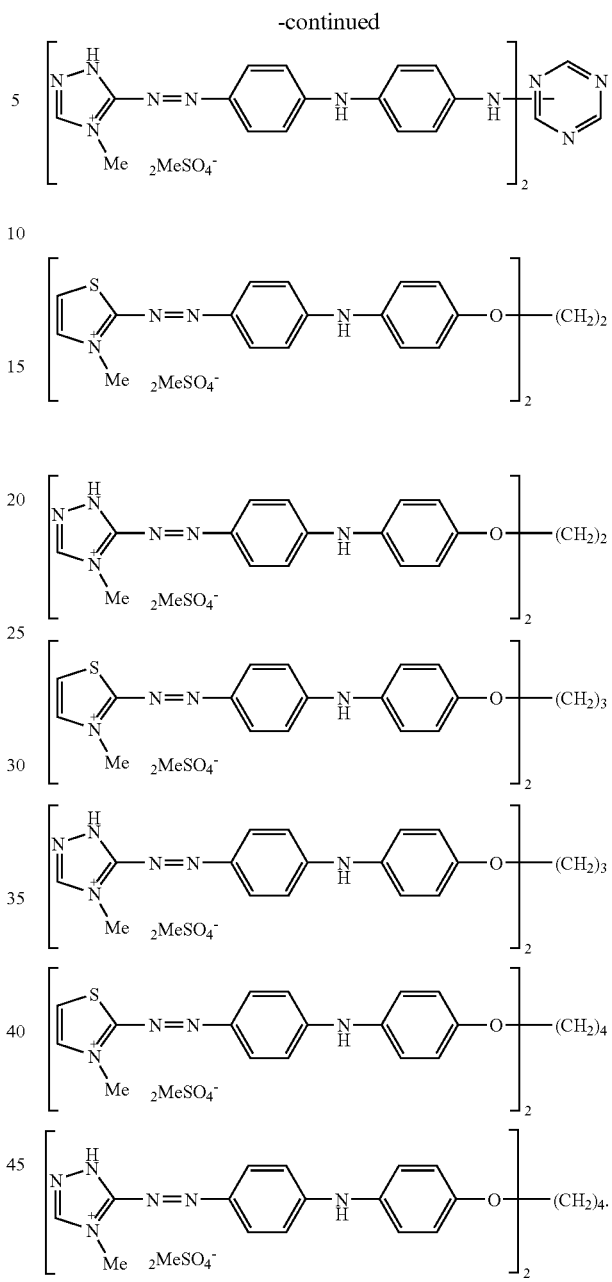
* * * * *

UNITED STATES PATENT AND TRADEMARK OFFICE
CERTIFICATE OF CORRECTION

PATENT NO. : 7,407,516 B2 Page 1 of 11
APPLICATION NO. : 10/480152
DATED : August 5, 2008
INVENTOR(S) : Laurent Vidal It is certified that error appears in the above-identified patent and that said Letters Patent is hereby corrected as shown below:

In claim 1, column 25, lines 36-41, " 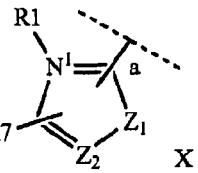 X " should read

-- 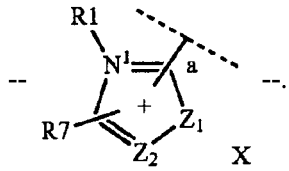 --.

In claim 1, column 26, lines 50-51, "3 to 6 membered" should read
--3- to 6-membered--.

In claim 11, column 28, line 6, "1  -carboxymethyl," should read --1-carboxymethyl,--.

In claim 14, column 28, lines 16-17, "1  -carboxymethyl," should read
--1-carboxymethyl,--.

In claim 38, column 30, lines 42-47, " 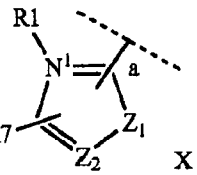 " should read

-- 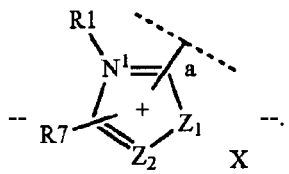 --.

UNITED STATES PATENT AND TRADEMARK OFFICE
CERTIFICATE OF CORRECTION

PATENT NO.       : 7,407,516 B2
APPLICATION NO.  : 10/480152
DATED            : August 5, 2008
INVENTOR(S)      : Laurent Vidal It is certified that error appears in the above-identified patent and that said Letters Patent is hereby corrected as shown below:

In claim 43, column 34, lines 22-66,

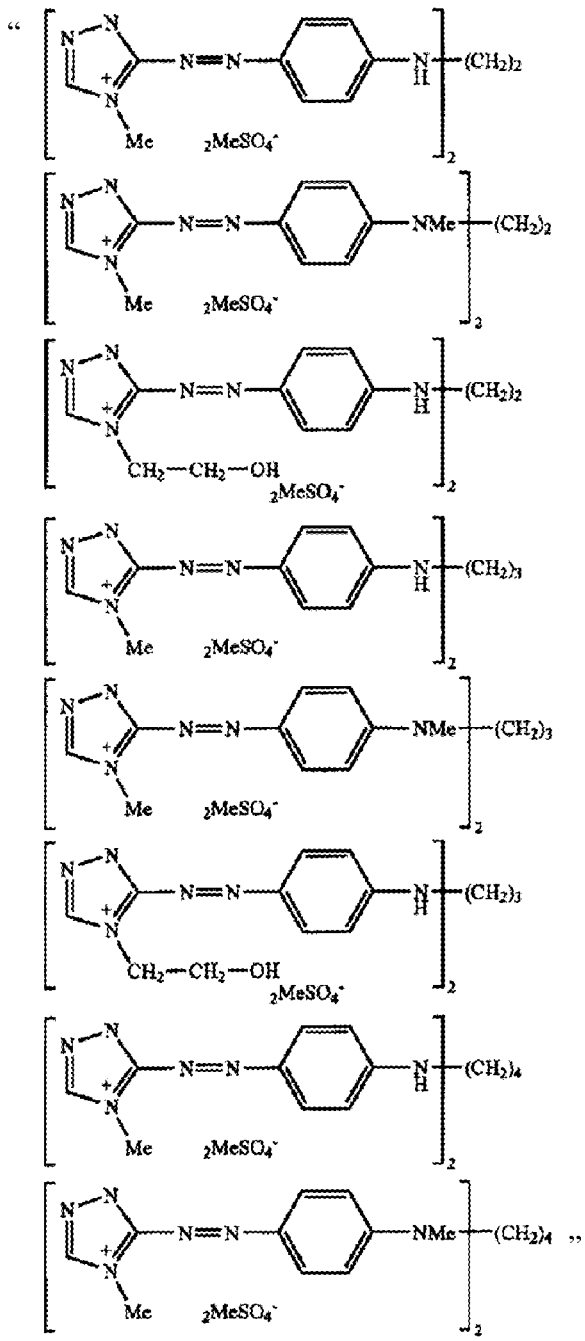

UNITED STATES PATENT AND TRADEMARK OFFICE
CERTIFICATE OF CORRECTION

PATENT NO. : 7,407,516 B2 Page 3 of 11
APPLICATION NO. : 10/480152
DATED : August 5, 2008
INVENTOR(S) : Laurent Vidal It is certified that error appears in the above-identified patent and that said Letters Patent is hereby corrected as shown below:

should read

-- 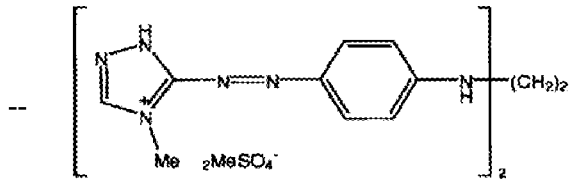

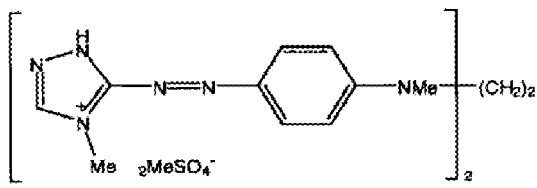

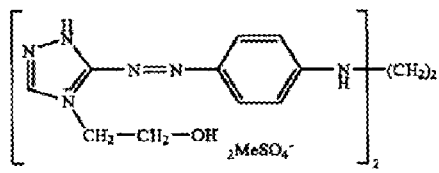

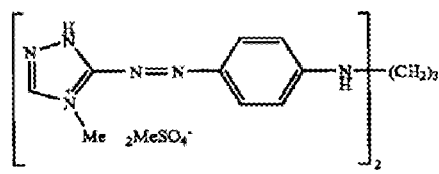

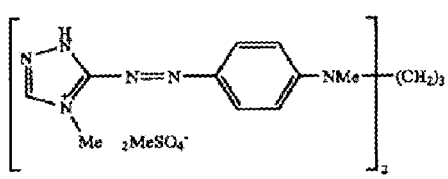

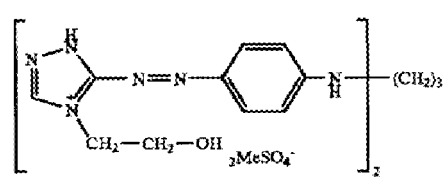

UNITED STATES PATENT AND TRADEMARK OFFICE
CERTIFICATE OF CORRECTION

PATENT NO. : 7,407,516 B2
APPLICATION NO. : 10/480152
DATED : August 5, 2008
INVENTOR(S) : Laurent Vidal It is certified that error appears in the above-identified patent and that said Letters Patent is hereby corrected as shown below:

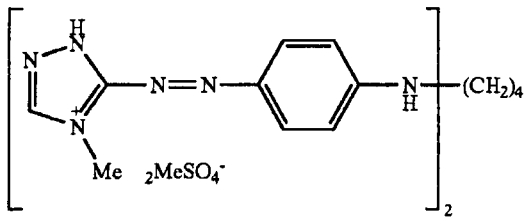

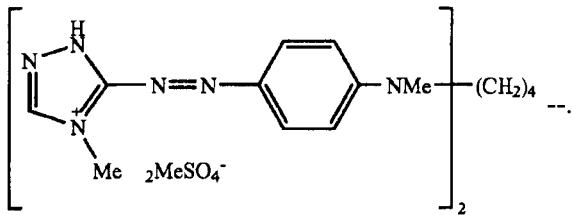

In claim 43, column 35, lines 2-31,

"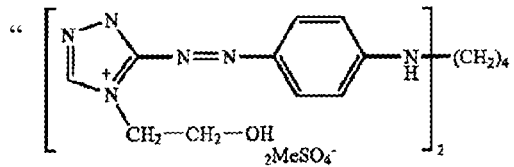

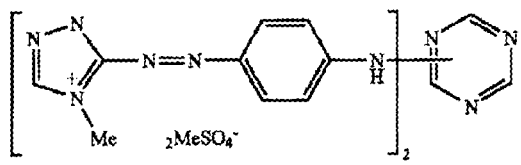

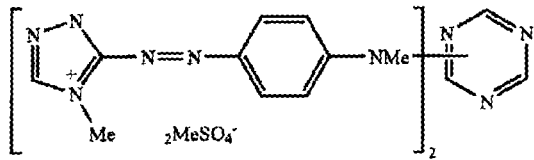

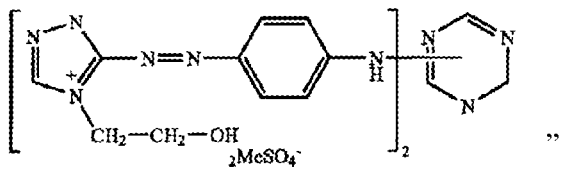
"

UNITED STATES PATENT AND TRADEMARK OFFICE
CERTIFICATE OF CORRECTION

PATENT NO. : 7,407,516 B2
APPLICATION NO. : 10/480152
DATED : August 5, 2008
INVENTOR(S) : Laurent Vidal It is certified that error appears in the above-identified patent and that said Letters Patent is hereby corrected as shown below:

should read

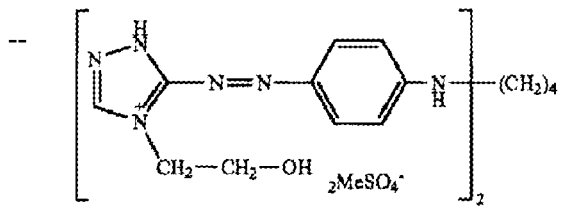

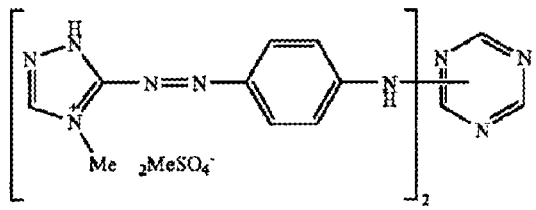

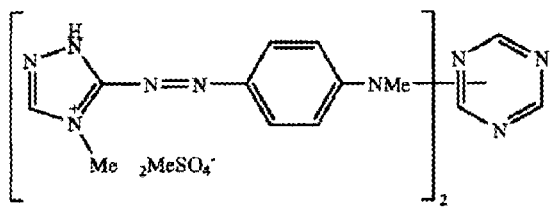

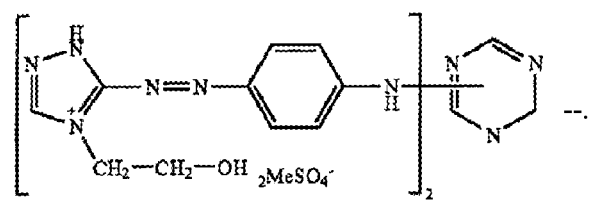

UNITED STATES PATENT AND TRADEMARK OFFICE
CERTIFICATE OF CORRECTION

PATENT NO.      : 7,407,516 B2
APPLICATION NO. : 10/480152
DATED           : August 5, 2008
INVENTOR(S)     : Laurent Vidal It is certified that error appears in the above-identified patent and that said Letters Patent is hereby corrected as shown below:

In claim 43, column 36, lines 43-66,

"
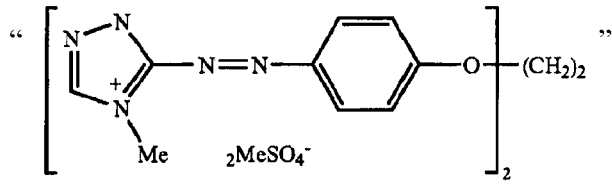

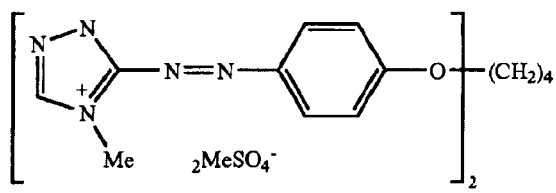

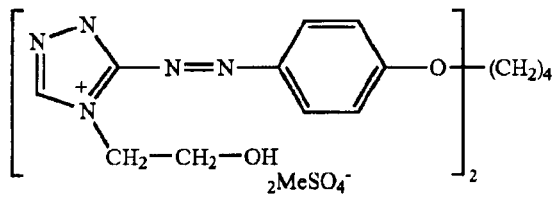

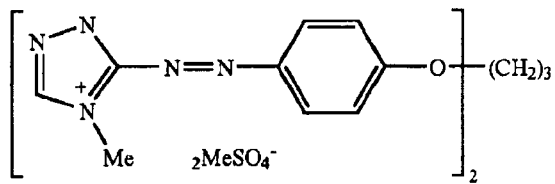
"

should read

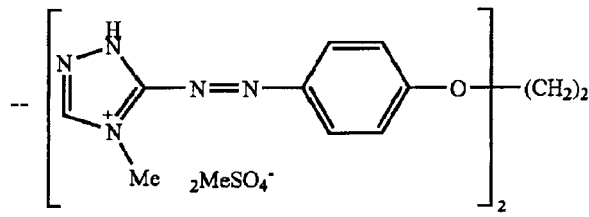

UNITED STATES PATENT AND TRADEMARK OFFICE
CERTIFICATE OF CORRECTION

PATENT NO. : 7,407,516 B2  
APPLICATION NO. : 10/480152  
DATED : August 5, 2008  
INVENTOR(S) : Laurent Vidal Page 7 of 11

It is certified that error appears in the above-identified patent and that said Letters Patent is hereby corrected as shown below:

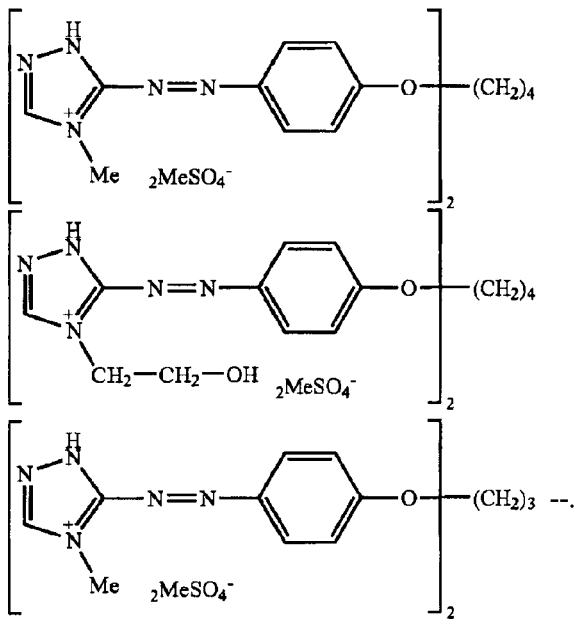

In claim 43, column 37, lines 2-14,

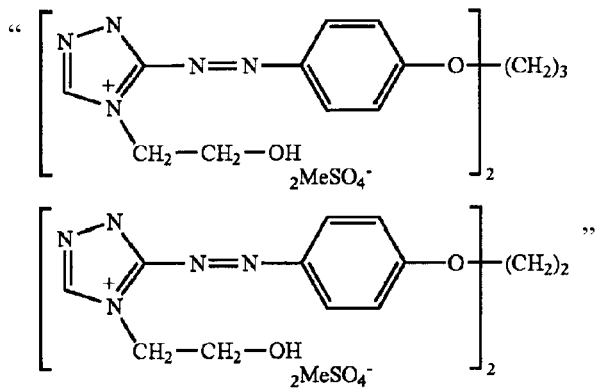

UNITED STATES PATENT AND TRADEMARK OFFICE
CERTIFICATE OF CORRECTION

PATENT NO. : 7,407,516 B2  Page 8 of 11
APPLICATION NO. : 10/480152
DATED : August 5, 2008
INVENTOR(S) : Laurent Vidal It is certified that error appears in the above-identified patent and that said Letters Patent is hereby corrected as shown below:

should read

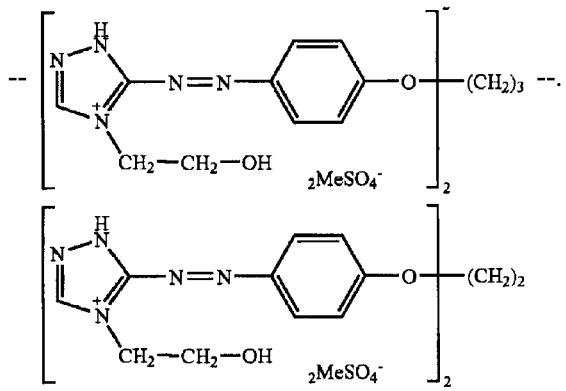

In claim 43, column 37, lines 56-61,

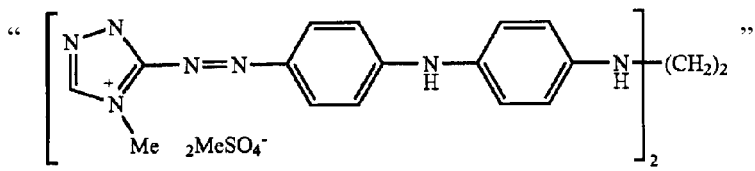

should read

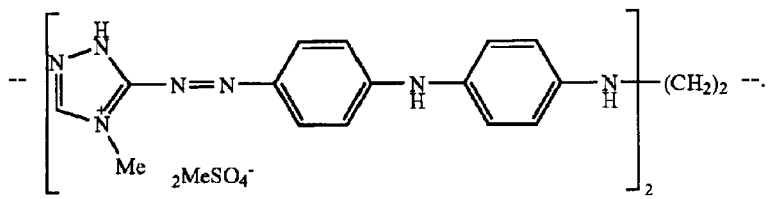

In claim 43, column 38, lines 2-7,

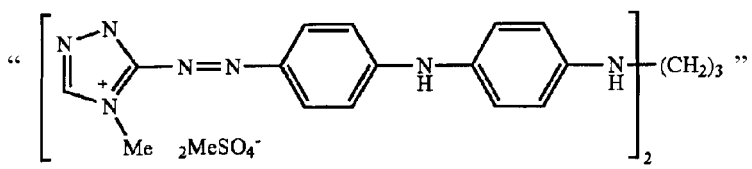

UNITED STATES PATENT AND TRADEMARK OFFICE
CERTIFICATE OF CORRECTION

PATENT NO.      : 7,407,516 B2
APPLICATION NO. : 10/480152
DATED           : August 5, 2008
INVENTOR(S)     : Laurent Vidal It is certified that error appears in the above-identified patent and that said Letters Patent is hereby corrected as shown below:

should read

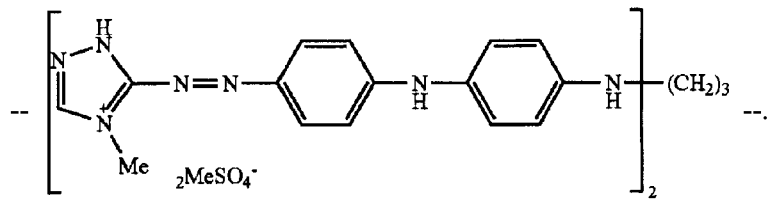

In claim 43, column 38, lines 14-18,

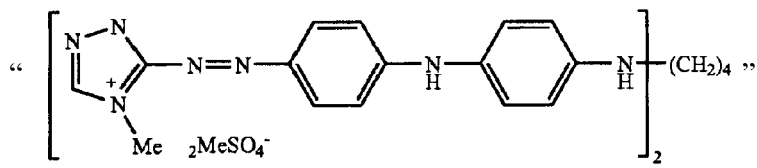

should read

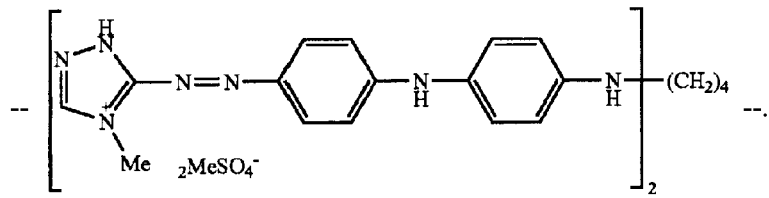

In claim 43, column 38, lines 24-28,

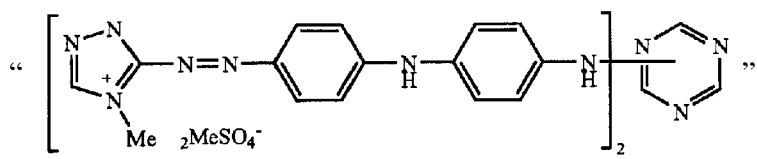

should read

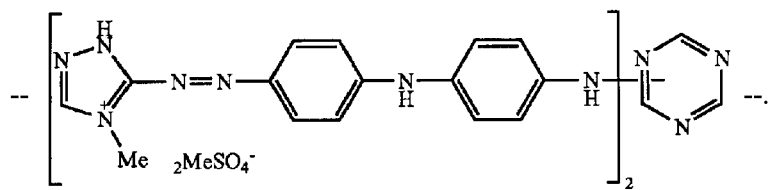

UNITED STATES PATENT AND TRADEMARK OFFICE
CERTIFICATE OF CORRECTION

PATENT NO.      : 7,407,516 B2
APPLICATION NO. : 10/480152
DATED           : August 5, 2008
INVENTOR(S)     : Laurent Vidal It is certified that error appears in the above-identified patent and that said Letters Patent is hereby corrected as shown below:

In claim 43, column 38, lines 35-40,

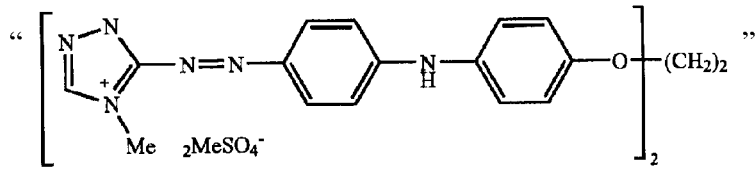

should read

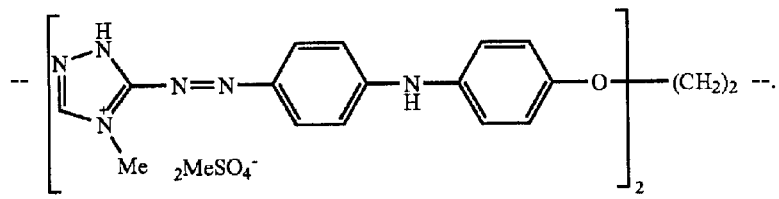

In claim 43, column 38, lines 47-51,

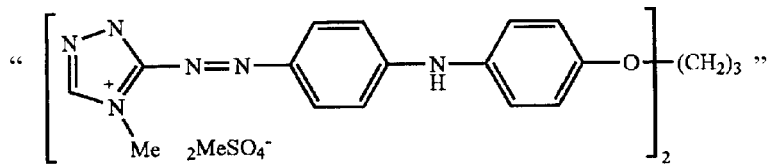

should read

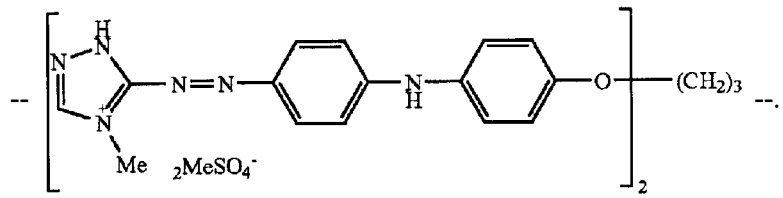

UNITED STATES PATENT AND TRADEMARK OFFICE
CERTIFICATE OF CORRECTION

PATENT NO. : 7,407,516 B2
APPLICATION NO. : 10/480152
DATED : August 5, 2008
INVENTOR(S) : Laurent Vidal It is certified that error appears in the above-identified patent and that said Letters Patent is hereby corrected as shown below:

In claim 43, column 38, lines 58-62,

" 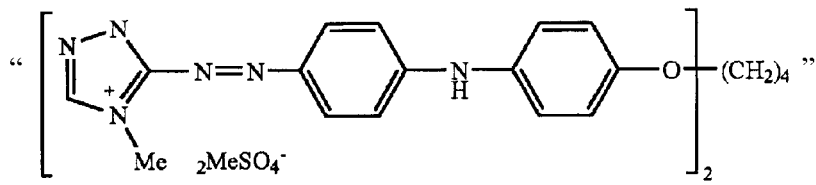 "

should read

-- 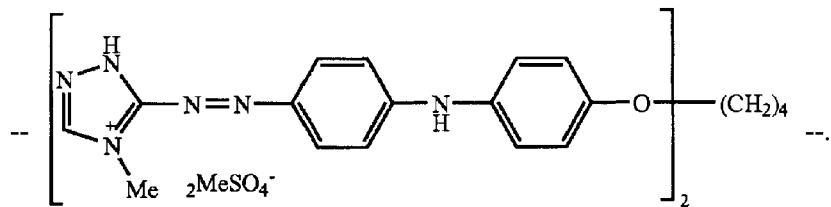 --.

Signed and Sealed this

Thirtieth Day of September, 2008

JON W. DUDAS
*Director of the United States Patent and Trademark Office*